US006813270B1

(12) United States Patent
Oz et al.

(10) Patent No.: US 6,813,270 B1
(45) Date of Patent: Nov. 2, 2004

(54) METHOD AND SYSTEM FOR GENERATING AND PROVIDING DELAYED MEDIA UNIT SEQUENCES TO END-USERS

(75) Inventors: Ran Oz, Modiin (IL); Oren Reches, Zoran (IL)

(73) Assignee: Bigband Networks, Inc., Fremont, CA (US)

( * ) Notice: Subject to any disclaimer, the term of this patent is extended or adjusted under 35 U.S.C. 154(b) by 519 days.

(21) Appl. No.: 09/911,930

(22) Filed: Jul. 23, 2001

Related U.S. Application Data

(63) Continuation-in-part of application No. 09/579,551, filed on May 26, 2000, now Pat. No. 6,434,141.

(51) Int. Cl.[7] ............................................... H04L 12/56

(52) U.S. Cl. ........................ 370/394; 370/486; 370/535

(58) Field of Search ................................. 370/352, 422, 370/394, 427, 426, 419, 420, 535, 486, 538, 539, 540, 353, 355, 356, 487; 709/227, 228

(56) References Cited

U.S. PATENT DOCUMENTS 5,719,786 A * 2/1998 Nelson et al. ............... 709/219

* cited by examiner

*Primary Examiner*—Chi Pham
*Assistant Examiner*—Alexander O. Boakye
(74) *Attorney, Agent, or Firm*—Blakely Sokoloff Taylor & Zafman LLP

(57) ABSTRACT

A system and method for allowing an end-user to control a display of a media unit sequence by filtering a media unit sequence from a multiplexed sequence comprising a live media unit sequence and a plurality of delayed media unit sequences. The method includes the steps of: (1) Receiving a live media unit sequence. (2) Delaying the live media unit sequence by a plurality of delay periods thereby providing a delayed media unit sequence for each of said plurality of delay periods. (3) Modifying each delayed media unit sequence such that each delayed media unit sequence is distinguishable from another delayed media unit sequence and from the live media unit sequence. (4) Multiplexing the live media unit sequence and the plurality of delayed media unit sequences to generate a multiplexed sequence. (5) Transmitting the multiplexed sequence to at least one end user.

44 Claims, 16 Drawing Sheets

US 6,813,270 B1

METHOD AND SYSTEM FOR GENERATING AND PROVIDING DELAYED MEDIA UNIT SEQUENCES TO END-USERS

RELATED CASES

This patent application is a Continuation-In-part of U.S. patent application Ser. No. 09/579,551 Filed May 26, 2000 now U.S. Pat. No. 6,434,141.

This patent incorporates by reference U.S. patent application "Method and System for prioritized Bit Rate Conversion" of Oz et al filed at May 29, 2001 and U.S. patent application "Method and System for comparison-based prioritized Bit Rate Conversion" of Strasman et al filed at 29 May 2001.

FIELD OF THE INVENTION

The present invention relates to communication systems and especially to methods and systems for providing delayed media unit sequences to end-users.

BACKGROUND OF THE INVENTION

Video Cassette Recorder (VCR) allowed an end-user to control presentation of a previously stored program. The end-user was able to stop or pause the display of the recorded program, to advance or rewind the previously stored program.

U.S. reissue RE 36,801 of Logan et al describes a system that offers an end-user a certain amount of control on a received program, by storing the received program in a circular buffer and displaying selected portions (delayed by a selected delay period) to an end-user. This solution has some disadvantages. First, it requires to install such a device at each end-user's premises. Second, since video, even in a compressed form, is memory consuming, the circular buffer can either store a very limited amount of video signals or it can be relatively expensive. The limited amount of stored video can allow to handle programs during a limited time period. Third, the system allows to "skip" commercials that are included in the broadcasted programs, thus causing monetary damages to the broadcasters and to the advertisers.

Near video on demand systems are known in the art. A brief description of some systems and methods for implementing near video on demand are illustrated at the following European patent applications: EP 0804028 of Ebihara, EP 1028588A1 of Inoue et al and PCT patent application WO99/291108 of Fransmae et al.

Near video on demand systems allow a user to purchase or rent prestored programs such as movies and the like, using a broadcast technique known as staggered time. These systems usually involve an interaction between an end-user and the system. Near video on demand systems are configured to handle pre-stored programs and not live programs. There is a need to provide a centralized system and method that allows an end-user to control a display of a live media unit sequences such as programs, in a broadcast environment.

There is a need to provide an efficient system and method that allows an end-user to control a display of live media unit sequences such as programs in a broadcast environment.

There is a need to provide a system and method that allows an end-user to control and display of live media unit sequences such as programs, said control including pausing a display of program, "fast forwarding", "fast rewinding" and the like for a relative long time period.

SUMMARY OF THE PRESENT INVENTION

It is an object of the present invention to provide systems and methods for allowing an end-user to control a display of live media unit sequences in a broadcast environment. The method including the steps of: receiving a live media unit sequence, modifying and delaying the live media unit sequence by at least one delay period to provide at least one corresponding delayed media unit sequence; multiplexing at least two selected media unit sequences out of the live media unit sequence and the at least one corresponding delayed media unit sequence to form a multiplexed signal; transmitting the multiplexed signal to an end-user. The end-user can control the display of a media unit sequence by selecting a selected media unit sequence.

According to an aspect of the invention the amount of delayed media unit sequences and/or the delay period between successive delayed media unit sequences can be adjusted in view of various parameters such as, but not limited to, bandwidth constraints, other media unit sequences being provided to the end users, end-user's viewing patterns, end-user's requests to receive certain media unit sequences and the like.

According to an aspect of the invention, the system can receive end-user selection information indicating which events (such as the Super Bawl) or media unit sequences to process to provide the live media unit sequence and at least one delayed media unit sequence, a number of delayed media unit sequences and a preferred delay period between successive delayed media unit sequences. The system can receive said information and process it in advance or can receive a processed information reflecting the end-user's preferences. The end-user's selection information is then utilized to determine the delay period between successive delayed media unit sequences and the number of delayed media unit sequences.

The invention provides a system for allowing an end-user to control a display of a live media unit sequence, the system includes a reception interface, at least one delay and modification unit, a control unit and a multiplexer. The reception interface is configured to receive a live media unit sequence and to provide the live media unit sequence to the multiplexer and to at least one of the delay and modification units. A delay and modification unit is configured to receive the live media unit sequence (or a media unit sequence that was delayed by previous delay units), to generate at least one delayed media unit sequence by delaying the media unit sequence for a predefined period of time and modifying the delayed media unit sequence such that it can be distinguished from the live media unit sequence and other delayed media unit sequences originating from the same live media unit sequence. The delay and modification unit provides the delayed media unit sequence to the multiplexer.

According to another aspect of the invention the multiplexer is also configured to further multiplex additional media unit sequences, the additional media unit sequences are not related to the live media unit sequence. The control unit is configured to control the modifications of delayed media unit sequences such that they can be distinguished from each other and from additional media unit sequences. For example, assuming that the media unit sequences and additional media unit sequences are MPEG compliant programs and that each program/additional program/delayed program has a unique set of PIDs, then the control unit must confirm that the PIDs that are provided to the delayed program differ from the PIDs of the live program and those of the additional programs, especially those programs that are transmitted to the same end-users. Conveniently, a dedicated PID range is allocated to each delayed media unit sequence. Usually the PID allocation is reflected in information that is transmitted to the end user. For example, MPEG compliant Transport Streams deliver tables that include the mapping between PIDs and programs/elementary streams.

The invention provides a system that further has a control unit for analyzing the media unit sequences that are transmitted to end-users, and optionally to analyze end-users' behavior and accordingly to modify the delay period between successive delayed media unit sequences, and to change the number of transmitted delayed media unit sequences that originate from the same live media unit sequence.

According to yet another aspect of the invention, the live media unit sequence is provided to a broadband multimedia system that is configured to generate the delayed media unit sequences, and to dynamically switch between the live media unit sequence, the delayed media unit sequences and additional streams, such as media streams and data streams, from a plurality of sources to a plurality of destination.

BRIEF DESCRIPTION OF THE DRAWINGS

The present invention will be understood and appreciated more fully from the following detailed description taken in conjunction with the drawings in which.

DETAILED DESCRIPTION

The disclosed technique is directed to broadband network, which can be either wired or wireless, such as an HFC network, a DSL network, satellite communication and the like. The examples set forth interfaces an HFC network and hence includes specific cable related modules. For example, a network transmitter in the context of an HFC would be a QAM unit. These specific modules have to be replaced with equivalent modules, when operating on other types of broadband networks.

It is noted that the description related to MPEG compliant programs, but the invention is applicable to other types of media unit sequences as well.

The following are definitions, which are used throughout the description of the disclosed technique:

DVB/ASI and DHEI are examples for digital video (MPEG) transmission specifications. The disclosed technique provides examples, which include DVB/ASI modules. It is noted that these DVB/ASI modules, can be replaced by equivalent modules, such as DHEI modules, and the like.

DOCSIS is a data over cable transmission specification. CMTS denotes cable modem termination system, which is conventionally used for DOCSIS. MPEG denotes a family of media (especially video and audio) decoding and multiplexing specifications where ISO/IEC 11172 is also called MPEG-1 and the ISO/IEC 13818 is also called MPEG-2.

"Live media unit sequence" (or live program) is a media unit sequence (or program) that is either generated in real time or near real time. The term does not include media unit sequences, such as movies and the like, that are received and stored at storage units and servers, to be transmitted to end-users in predefined period of times or upon request.

Figure 10:
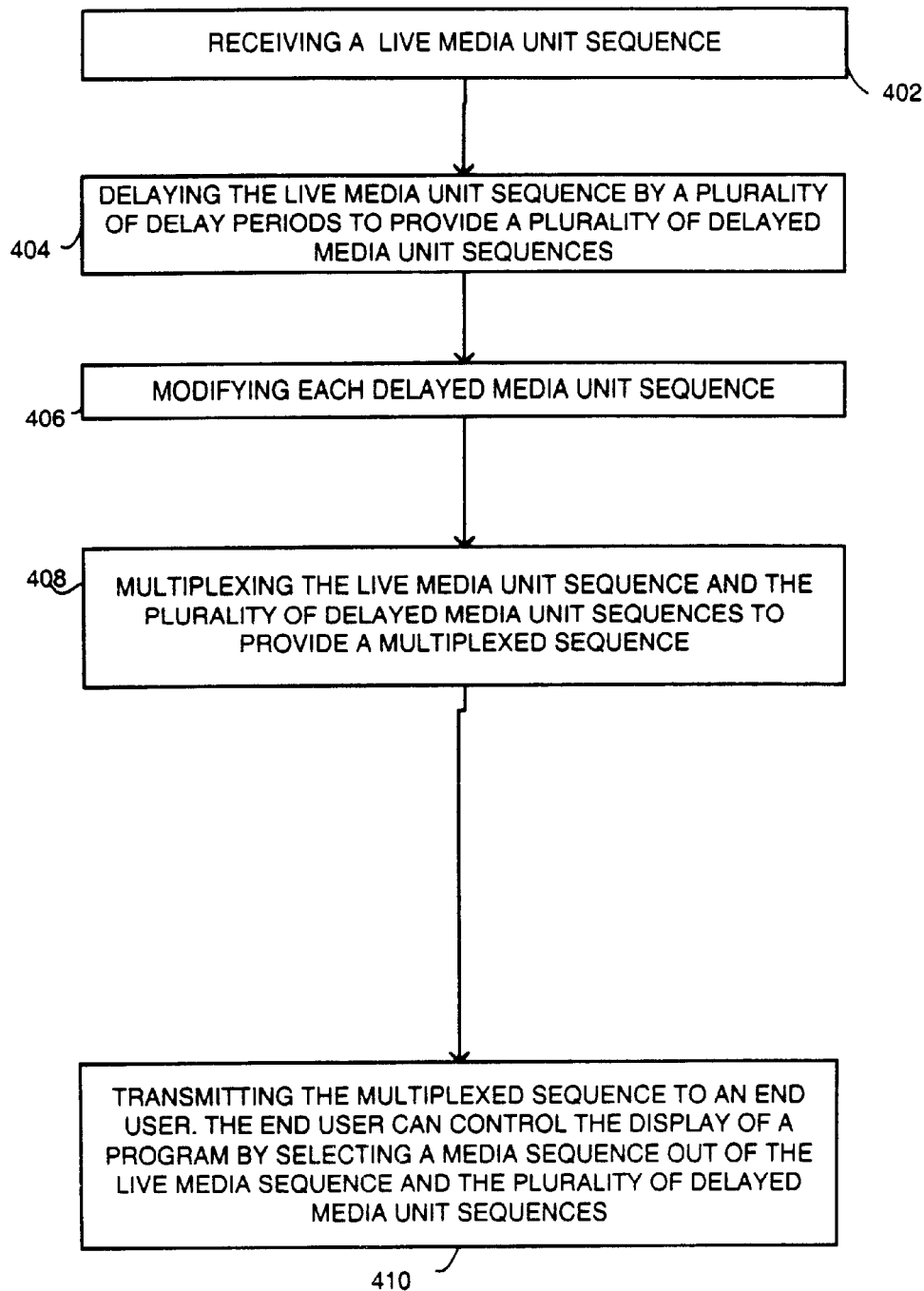
FIGS. 10 and 11 are flow charts illustrating methods for allowing an end-user to control a display of a media unit sequence by filtering a media unit sequence from a multiplexed sequence comprising a live media unit sequence and a plurality of delayed media unit sequences, in accordance with a further preferred embodiment of the present invention.

Referring to FIG. 10, illustrating method 400 for allowing an end-user to control a display of a media unit sequence by filtering a media unit sequence from a multiplexed sequence comprising a live media unit sequence and a plurality of delayed media unit sequences.

Method 400 starts at step 402 of receiving a live media unit sequence. The live media unit sequence can be a program.

Step 402 is followed by step 404 of delaying the live media unit sequence by a plurality of delay periods thereby providing a delayed media unit sequence for each of said plurality of delay periods. According to an aspect of the invention a plurality of delay units, such as first in first out (FIFO) storage units, are cascaded to provide a plurality of delayed media unit sequence. Conveniently, the delay period and even the number of delayed programs can be altered. A delay period of a FIFO storage unit can be altered by altering a difference between a read pointer to a write pointer of the FIFO storage unit. The number of delayed media unit sequences can be altered by changing a number of delayed programs to be output from the FIFO storage units to multiplexers or transmitters. This alteration can also involve assigning different priorities to different delayed programs and performing priority-based multiplexing.

Step 404 is followed by step 406 of modifying each delayed media unit sequence such that each delayed media unit sequence is distinguishable from another delayed media unit sequence and from the live media unit sequence. For example, assuming that the media unit sequences include MPEG compliant elementary streams, then each elementary stream has a unique program identifier PID, whereas at least one elementary stream is referred to as a single program. The step of modifying the delayed programs can include PID-remapping—each delayed program is assigned a distinct set of PIDs. The relationship between PIDs and the associated programs/ elementary streams is transmitted to the end users, allowing the end-users to filter a media unit sequence by selecting the relevant media unit PIDs out of the plurality of distinct PIDs.

Step 406 is followed by step 408 of multiplexing the live media unit sequence and the plurality of delayed media unit sequences to generate a multiplexed sequence.

Step 408 is followed by step 410 of transmitting the multiplexed sequence to at least one end user.

Figure 11:
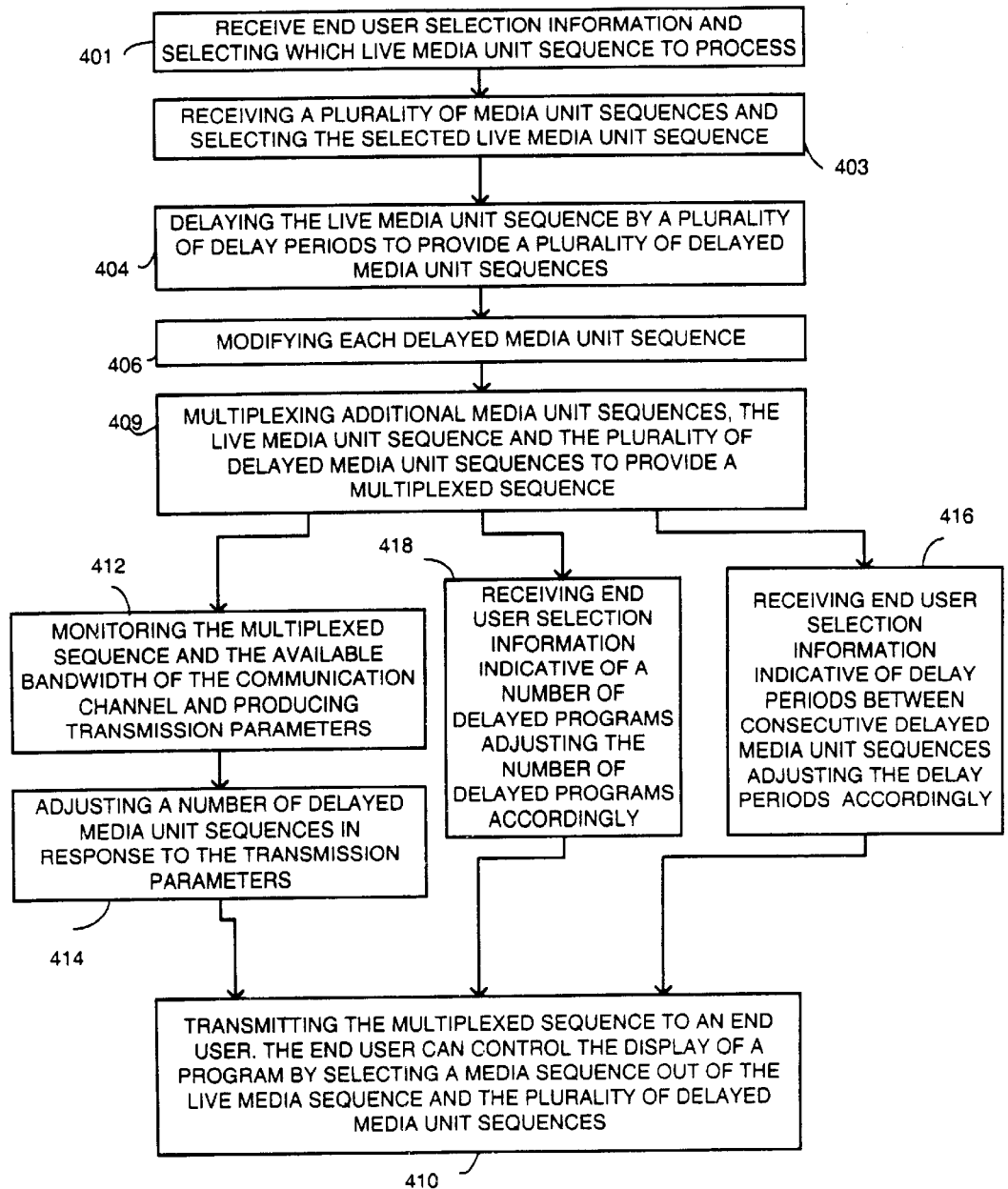

Referring to FIG. 11, illustrating method 420 for allowing an end-user to control a display of a media unit sequence by filtering a media unit sequence from a multiplexed sequence comprising a live media unit sequence and a plurality of delayed media unit sequences.

Method 420 is analogous to method 400 but has additional steps 401, 403 (replacing step 402) 409 (replacing step 408), 412, 414, 416 and 418.

Method 420 starts at step 401 of receiving end-user selection information, being indicative of which media unit sequence out of a plurality of received media unit sequences to process to generate at least one delayed media unit sequence; and selecting which media unit sequence to process to provide delayed media unit sequences, in response to the end-user selection information.

It is noted that the reception of the end-user selection information and the selection can be done in various manners and during various time periods. For example, the end-user selection information can be provided by end-users or generated by tracking end-users viewing patterns.

Step 401 is followed by step 403 of receiving a plurality of media unit sequences and filtering the selected live media unit sequence. The live media unit sequence can be a program.

Step 403 is followed by step 404. Step 404 is followed by step 406. Step 406 is followed by step 409 of multiplexing additional media unit sequences, live media unit sequences and delayed media unit sequences to provide the multiplexed sequence.

Step 409 is followed by at least one of steps 412, 416 and 418.

Step 412 including monitoring the multiplexed sequence and an available bandwidth of the communication channel to provide transmission parameters. The transmission parameters can reflect bandwidth consumption, transmission resources allocation and the like. Step 412 is followed by step 414 of adjusting a number of delayed media unit sequences in response to the transmission parameters. If the aggregate bandwidth of the at least one delayed programs and the live program exceed the available bandwidth of the communication channel, then the number of transmitted delayed programs may be reduced. The reduction can be done by "dropping" some delayed programs, but can also involve an increasing of the delay periods between the remaining programs.

Step 414 can also include compressing at least one media unit sequence if the aggregate size of the multiplexed sequence exceeds the available bandwidth.

Step 416 includes receiving end-user selection information, being indicative of requested delay periods between consecutive delayed media unit sequences to be produced out of a single live media unit sequence, and delaying the live media unit sequence by a plurality of delay periods in response to the received end-user selection information.

Step 418 includes receiving end-user selection information, being indicative of a number of required delayed media unit sequences, and adjusting the delay period between delayed media unit sequences accordingly.

Steps 414, 416 and 418 are followed by step 410.

Figure 12:
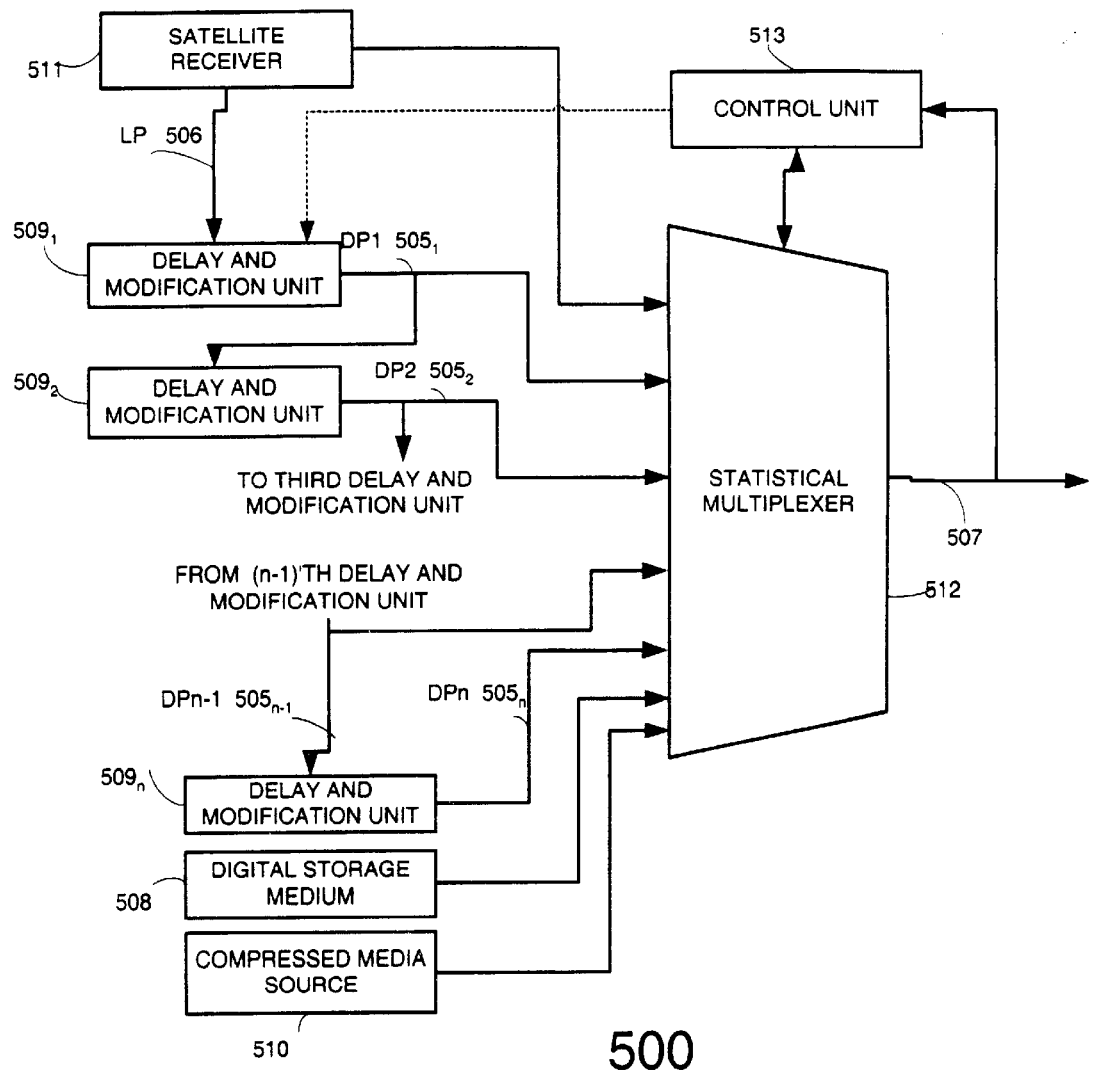
FIG. 12 is an illustration of a system for providing a multiplexed sequence, in accordance with a further preferred embodiment of the present invention.

Reference is now made to FIG. 12, which is a schematic illustration of system 500 for providing a multiplexed sequence, in accordance with a further preferred embodiment of the present invention.

System 500 includes live media sequence provider such as satellite receiver 511, a plurality of delay and modification units, such as delay and modification units $509_1$–$509_n$, statistical multiplexer 512, control unit 513. System 500 further includes additional media unit sequence providers such as digital storage medium 508 and compressed media source 510.

The delay and modification units are cascaded, and each unit provides a delayed media sequence to an adjacent delay and modification unit and to statistical multiplexer 512. Delayed media sequences DP1–DPn are provided by delay and modification units $509_1$–$509_n$ accordingly.

Satellite receiver 511 provides a live media unit sequence (denoted LP 506) to first delay and modification unit $509_1$. LP 506 is converted to delayed media unit sequences DP1–DPn $505_1$–$505_n$.

Statistical multiplexer 512 receives LP 506 and DP1–DPn $505_1$–$505_n$, and additional sequences from units 508 and 510, and multiplexes them to provide a multiplexed sequence to communication channel 507. Statistical multiplexer 512 can also include at least one compressing unit, for compressing media unit sequences.

Control unit 513 is coupled to a communication channel 507 for monitoring the available bandwidth of communication channel 507 and for monitoring the bandwidth and additional characteristics of the multiplexed sequence being generated by statistical multiplexer 512. Control unit 513 is coupled to delay and modification units $505_1$–$505_n$ but for convenience of explanation this is illustrated by a single dashed arrow that extends from control unit 513 to delay and modification unit $505_1$. The arrow illustrates that the delay period and even the number of delayed media unit sequences that are included within the multiplexed sequence can be adjusted in response to various parameters/schemes.

Figure 14:
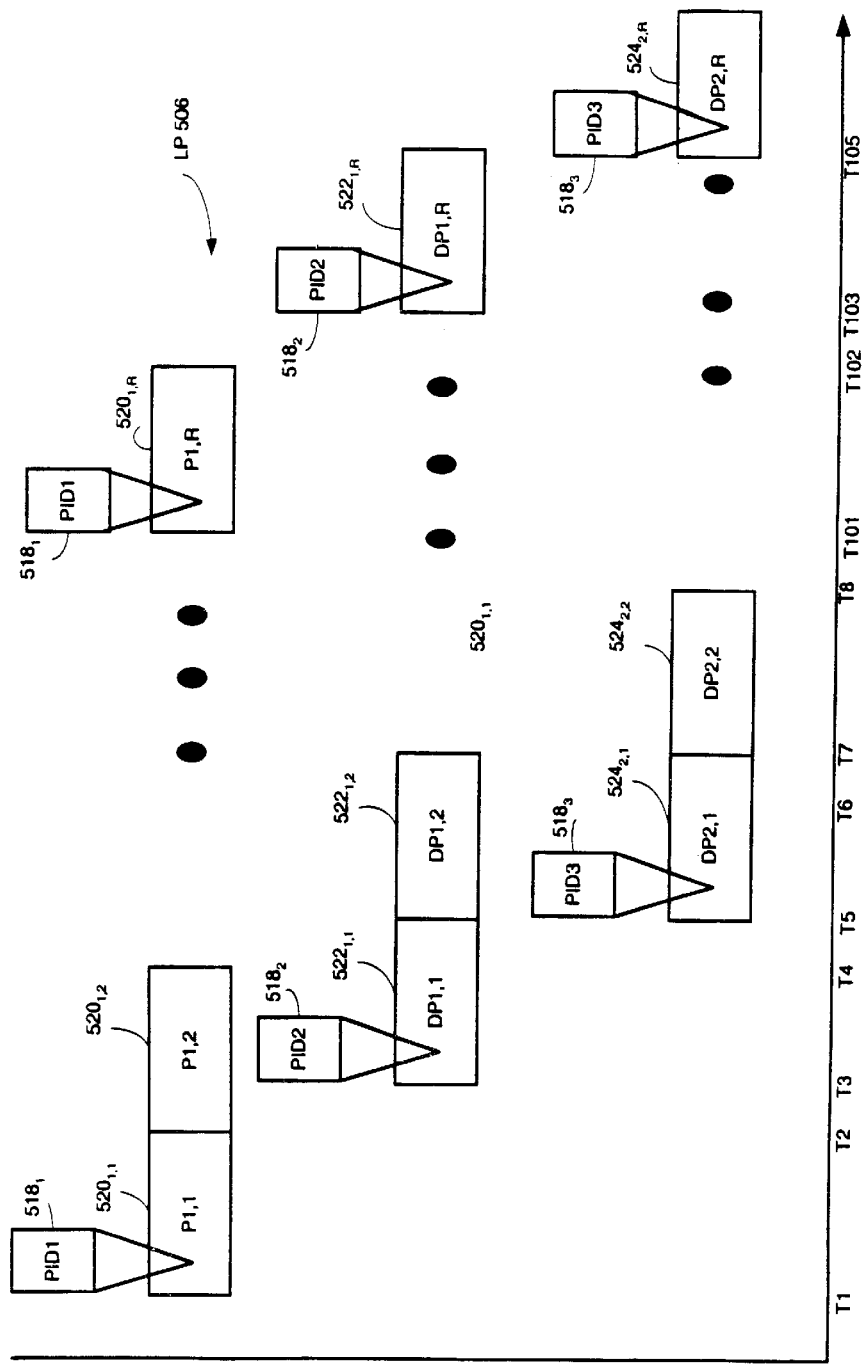
FIG. 14 is a timing diagram illustrating a live media unit sequence and a plurality of delayed media unit sequences in accordance with a further preferred embodiment of the present invention.

FIG. 14 is a timing diagram illustrating live media unit sequence LP 506 and a plurality of delayed media unit sequences, such as DP1 $505_1$ and DP2 $505_2$ in accordance with a further preferred embodiment of the present invention.

Live media unit sequence LP 506 includes media units P1,1–P1,R $520_{1,1}$–$520_{1,R}$. Each media unit has the same PID: PID1 $518_1$, indicating that the media unit belongs to LP 506. The first delayed media unit sequence DP1 $505_1$ includes media units DP1,1–DP1,R $522_{1,1}$–$522_{1,R}$. Each media unit has the same PID: PID2 $518_2$, indicating that the media unit belongs to DP1 $505_1$. The second delayed media unit sequence DP2 $505_2$ includes media units DP2,1–DP2,R $524_{1,1}$–$524_{1,R}$. Each media unit has the same PID: PID3 $518_3$, indicating that the media unit belongs to DP2 $505_2$.

The delayed media sequences ware generated by delaying LP 506 and changing the PID of each media unit. Media unit P1,1 is received at time T1, and is converted to delayed media units DP1,1 and DP2,1 that are transmitted at times T3 and T5 respectively. Media unit P1,2 is received at time T2, and is converted to delayed media units DP1,2 and DP2,2 that are transmitted at times T5 and T7 respectively. Media unit P1,R is received at time T101, and is converted to delayed media units DP1,R and DP2,R that are transmitted at times T103 and T105 respectively.

Figure 1:
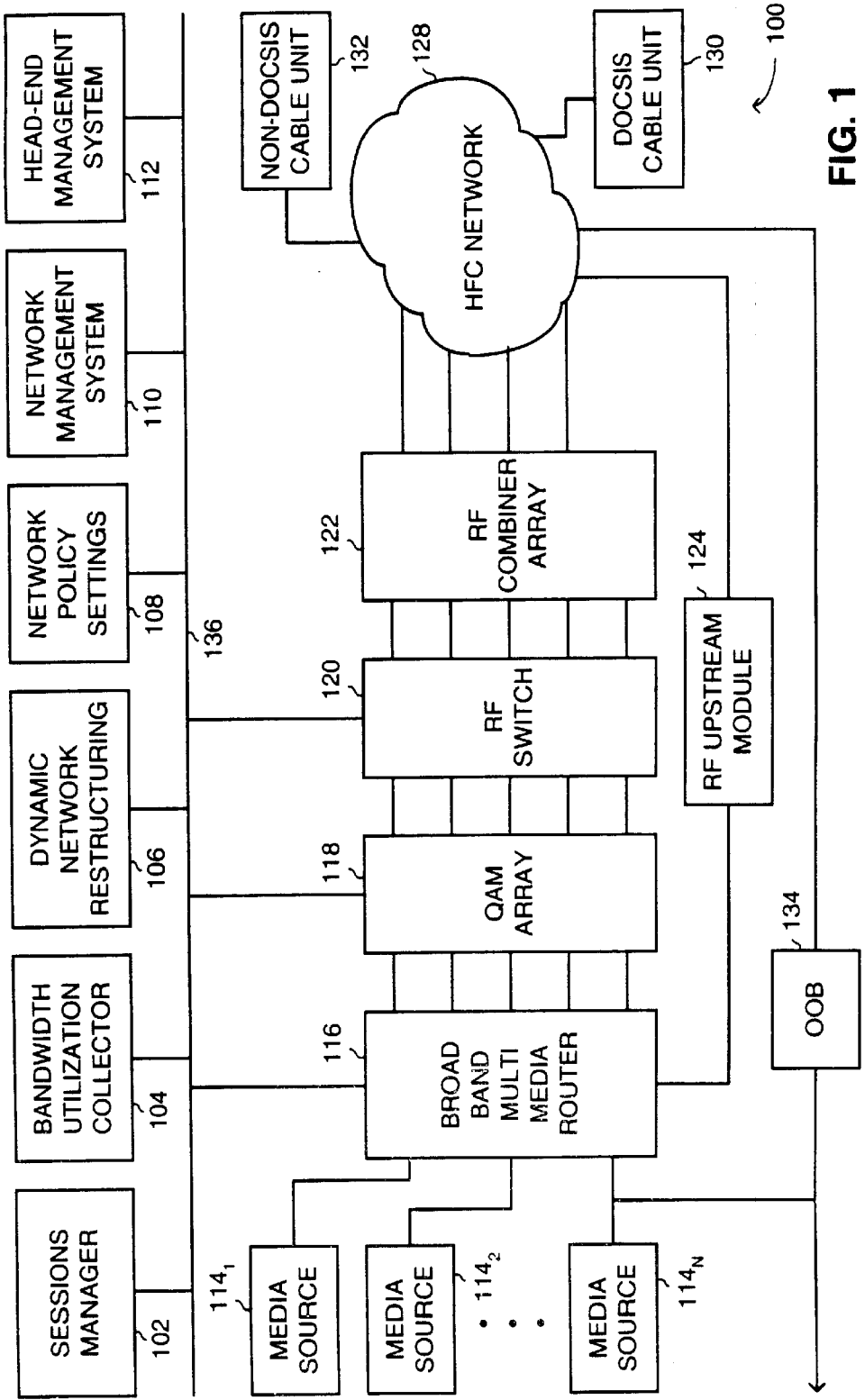
FIG. 1 is a schematic illustration of a Broadband Multimedia system, constructed and operative in accordance with a preferred embodiment of the present invention.

Reference is now made to FIG. 1, which is a schematic illustration of a Broadband Multimedia system, generally referenced 100, constructed and operative in accordance with a preferred embodiment of the present invention. System 100 includes a logical communication bus 136, a session manager unit 102, a bandwidth utilization collector 104, a dynamic network restructuring unit 106, a network policy settings unit 108, a network management system 110, and a head-end management system 112. System 100 further includes a plurality of media sources $114_1$,$114_2$ and $114_n$, a broadband multimedia router 116, a QAM array 118, an RF switch 120, an RF upstream module 124, an RF combiner array 122, an HFC network 128, a DOCSIS cable unit 130, a non-DOCSIS cable unit 132, and an Out-Of-Band unit 134.

Session manager unit 102, bandwidth utilization collector 104, dynamic network restructuring unit 106, network policy settings unit 108, network management system 110, and head-end management system are connected to the logical communication bus 136. Broadband multimedia router 116 is connected to media sources $114_1$ $114_2$, and $114_n$, to logical communication bus 136, RF upstream module 124 and to QAM array 118. RF switch 120 is connected to logical communication bus 136, QAM array 118 and to RF combiner array 122. RF upstream module 124 is connected to broadband multimedia router 116, to non-DOCSIS cable unit 132, and to DOCSIS cable unit 130 via HFC network 128. RF combiner array 122 is further connected to non-DOCSIS cable unit 132, Out-Of-Band unit 134 and to DOCSIS cable unit 130 via HFC network 128.

Session manager unit 102 receives and approves session requests, processes them and provides routing parameters to the broadband multimedia router 116. Broadband multimedia router 116 receives media unit sequences, such as media streams, from media source application $114_1$–$114_n$. It is noted that such media streams can include video streams, audio streams, data streams, individual data packets and the like. Such streams can be received over video channels, such as ones operative according to MPEG transport interfaces, or over data channels, such as TCP/IP Ethernet communication lines.

The routing parameters produced by session manager 102, specify input and output routing commands for broadband multimedia router 116, to operate there according. It is noted that a conventional MPEG transport stream does not include routing information such as destination or origin, rather just limited identification information, known as PID (Packet Identification) The disclosed technique overcomes this disadvantage as will be described in detail in conjunction with FIG. 6. Broadband multimedia router 116 forwards packets from a selected input port to a specified output port, according to either routing information embedded in the routed packet, or according to the routing parameters, associated with that routed packet.

According to the disclosed technique, each session entering the system has to be approved, and hence can also be denied. The session manager 102 receives session initialization requests from a variety of media sources, such as application servers, end users, and additional modules. The session manager 102, determines if these requests are compatible with each of a plurality of policy types and available resources, and determines whether or not to approve or deny these requests.

The session manager unit 102 uses bandwidth parameters stored in bandwidth utilization collector 104, regarding the current bandwidth utilization. The session manager 102 accesses network policy settings unit 108, to determine if a selected initialization request conforms to various network policies. A network policy can virtually include any condition, which applies to the content, type, source, destination, network, and the like, which are included in the session initialization request. For example, selected types of sessions are denied for a selected node, when the bandwidth usage at that node, exceeds a predetermined value. In another example, a network policy can include a condition, which does not allow X-rated movies to be transmitted to selected end users, at predetermined hours of the day. A further example for a network policy can include a condition where a selected source can only provide services to selected users, and not to others, and the like. The session manager further accesses network management system 110, for determining if there are malfunctions in selected parts of the network.

Broadband multimedia router 116 is connected to plurality of media sources $114_1$–$114_n$. Broadband multimedia router 116 directs data from these media sources to the appropriate output ports. QAM array 118 includes a plurality of QAM units (not shown), each receiving DVB/ASI media information and transmitting it modulated over an RF channel, connected thereto.

RF combiner array 122 includes a plurality of RF combiners (not shown), each operative to receive a plurality of RF channels and produce a single, multi-band RF signal, therefrom. The RF switch 120 is operative to route RF channels from each port therein, to each other port therein. Hence, RF switch 120 can connect each QAM of QAM array 118 to each RF combiner of RF combiner array 122, and thus, dynamically control network RF resources.

Dynamic network restructuring unit 106 controls each of the QAMs, thereby determining which frequencies that QAM shall modulate to. Dynamic Network Restructuring unit 106 further controls RF switch 120, such that the signals received from each of the QAMs are directed to a selected one of the RF combiners. Hence, Dynamic Network Restructuring unit 106 provides dynamic restructuring of the RF portion of the network. Each of the RF combiners receives channels in frequencies that have been transmitted from the QAM through RF switch, and combines them on a single line connected to HFC network 128. End user equipment, such as non-DOCSIS cable unit 132 and DOCSIS cable unit 130, is connected to the system via HFC network 128, and is thus able to receive these transmissions. This direction is called downstream. Non-DOCSIS cable unit 132 can include a simple set-top box, television set, and the like. DOCSIS cable unit 130 is a unit, which supports DOCSIS specification and can be a DOCSIS ready set-top box, a computer, a cable modem and the like.

According to the present invention, end user equipment is also capable of transmitting data. This direction is called upstream. RF upstream module 124 receives signals from the end user equipment, and performs down-conversion and demodulation thereof. RF upstream module 124 can further include an RF switching mechanism, which optimizes the usage of the upstream direction, and hence can further enhance the operation of system 100. The Out-Of-Band (OOB) module 134 communicates with each of the targets of that upstream information in the Head-end, thus providing a reverse channel from HFC network 128 to Head-end.

Figure 2A:
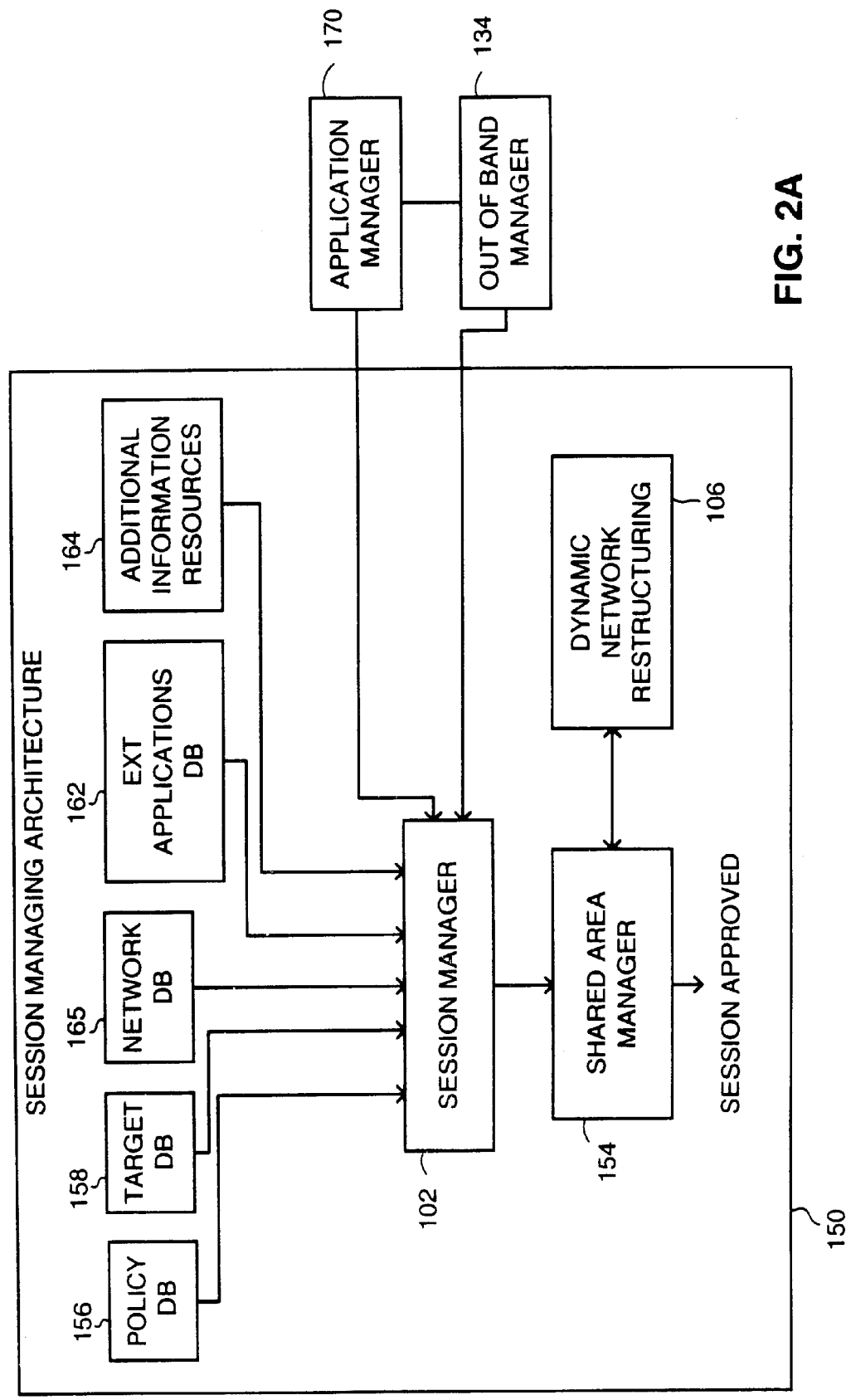
FIG. 2A is a schematic illustration of in detail of a session managing architecture, constructed and operative in accordance with another preferred embodiment of the resent invention.

Reference is now made to FIG. 2A, which is a schematic illustration in detail of a session managing architecture, generally referenced 150, constructed and operative in accordance with another preferred embodiment of the present invention. Session managing architecture 150 is described in conjunction with system 100 of FIG. 1.

Architecture 150 includes session manager 102 (FIG. 1), a shared area manager 154, a policy database 156, a target database 158, a network database 160, an external applications database 162, and an additional information resources 164. Architecture 150 further includes a Dynamic Network Restructuring Manager (DNR) 106 (FIG. 1), an application manager 170, and an Out-Of-Band manager 134 (FIG. 1).

Policy database 156 is a general policy database which includes a plurality of policy records specifying rules, such as what kind of information can be transmitted in the system, from which sources, to which targets, at what time, and the like. Target database 158 includes a plurality of target records. A target record can include information related to policies related to the target, network topological location of the target, and the like.

Network database 160 includes a plurality of network policy records. A network policy can include restrictions regarding overall usage of the network, such as a predetermined minimal transmission quality level for selected portions of the network, scheduling schemes for allocating selected portions of the network for specific services, and the like.

External applications database. 162 includes a plurality of external application records specifying data on these applications, such as what is allowed or forbidden for these applications, and how are these applications connected to the system.

Shared area manager 154 manages the bandwidth utilization for one group of nodes, where a node is further directly connected to a plurality of end users using end point equipment, which can include DOCSIS cable units, non-DOCSIS cable units, digital television sets, and the like. It assigns the optimal channel to the session. All of these nodes are connected to the same cable network, and hence are operative to receive transmissions over the same cables, supporting broadcast, multicast and unicast.

Session manager 102 is connected to shared area manager 154, policy database 156, target database 158, network database 160, external applications database 162, additional information resources 164, application manager 170, and Out-Of-Band manager 134. Application manager 170 is further connected to Out-Of-Band manager 134. Shared area manager 154 is further connected to DNR manager 106.

As stated above, session manager 102 is operative to approve or deny session initialization requests to the system 100 (FIG. 1). Session manager 102 receives an init-session request either from the application manager 170, or from the Out-Of-Band manager 134.

Figure 2B:
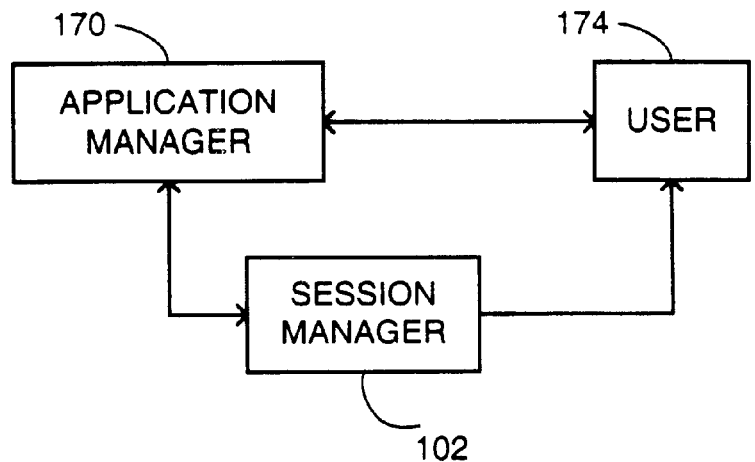
FIG. 2B is a schematic illustration of a session request example, in accordance with a further preferred embodiment of the present invention.
Figure 2C:
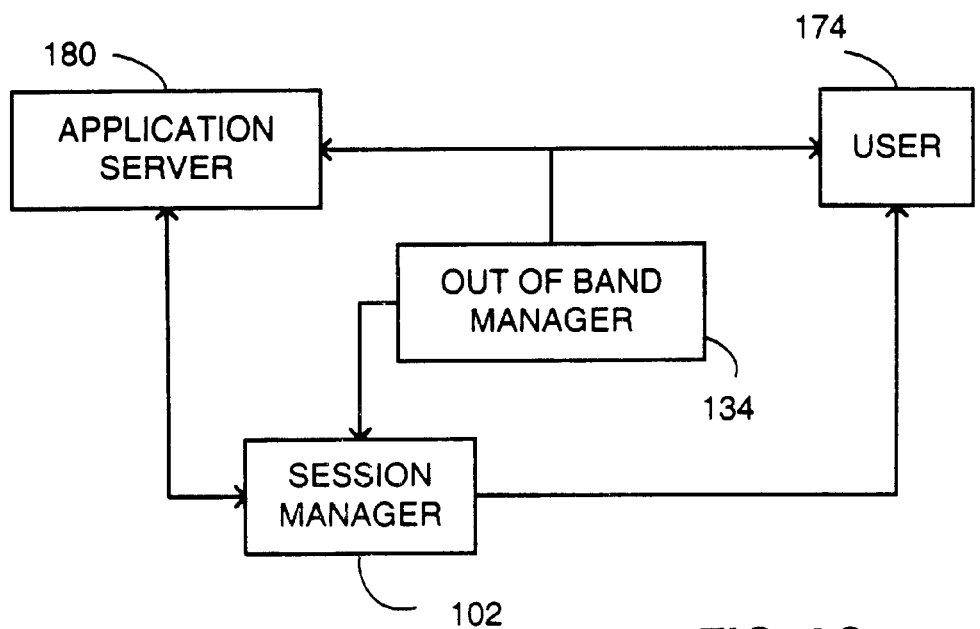
FIG. 2C is a schematic illustration of a session request example, in accordance with another preferred embodiment of the present invention.

Reference is further made to FIGS. 2B and 2C. FIG. 2B is a schematic illustration of a session request example, in accordance with one aspect of the present invention. FIG. 2C is a schematic illustration of a session request example, in accordance with another aspect of the present invention. With reference to FIG. 2B, the session initialization request to the session manager 102, is produced by the application manager 170 either internally or in sequence with a respective user 174 request therefrom. Alternatively, with reference to FIG. 2C, the session initialization request can be produced by the Out-Of-Band manager 134, in sequence with a respective user request to an application server 180. This is applicable in a case where the application manager 170 is not operative to forward a session initialization request to the session manager 102. In that case, the Out-Of-Band manager 134 detects the aforementioned user request, and directs a respective session initialization to session manager 102, to obtain approval. If approval is granted, then the session manager 102 provides an initiation command to the application server 180 to start producing and providing the application for that approved session.

Session manager 102 determines if the requested session can be approved according to a plurality of parameters such as network policies, target policies, general policies, application manager policies, additional information resources, and the like. It is noted that at this stage the session is not approved yet. The session manager accesses other modules such as the shared area manager 154 and the like, receives their "approval" and only then, approves the session and provides an initiation command to application server 180.

After the session manager 102 approves the session, it accesses the shared area manager 154, which attempts to allocate a suitable channel therefor. If the shared area manager 154 fails to allocate such a channel, then the session manager proceeds to the DNR manager 106. Otherwise, the session manager 102 approves the session.

The DNR manager 106 performs channel and frequency switching (in hardware), and dynamically changes the amount of channels, which are dedicated to each group of nodes, according to the bandwidth usage across groups of nodes. This allocation can be dynamic as long as the total number of dedicated channels, does not exceed the maximum frequency band that is physically achievable within any specific group of nodes. If allocation fails, then the session manager 102 denies the session.

Figure 3:
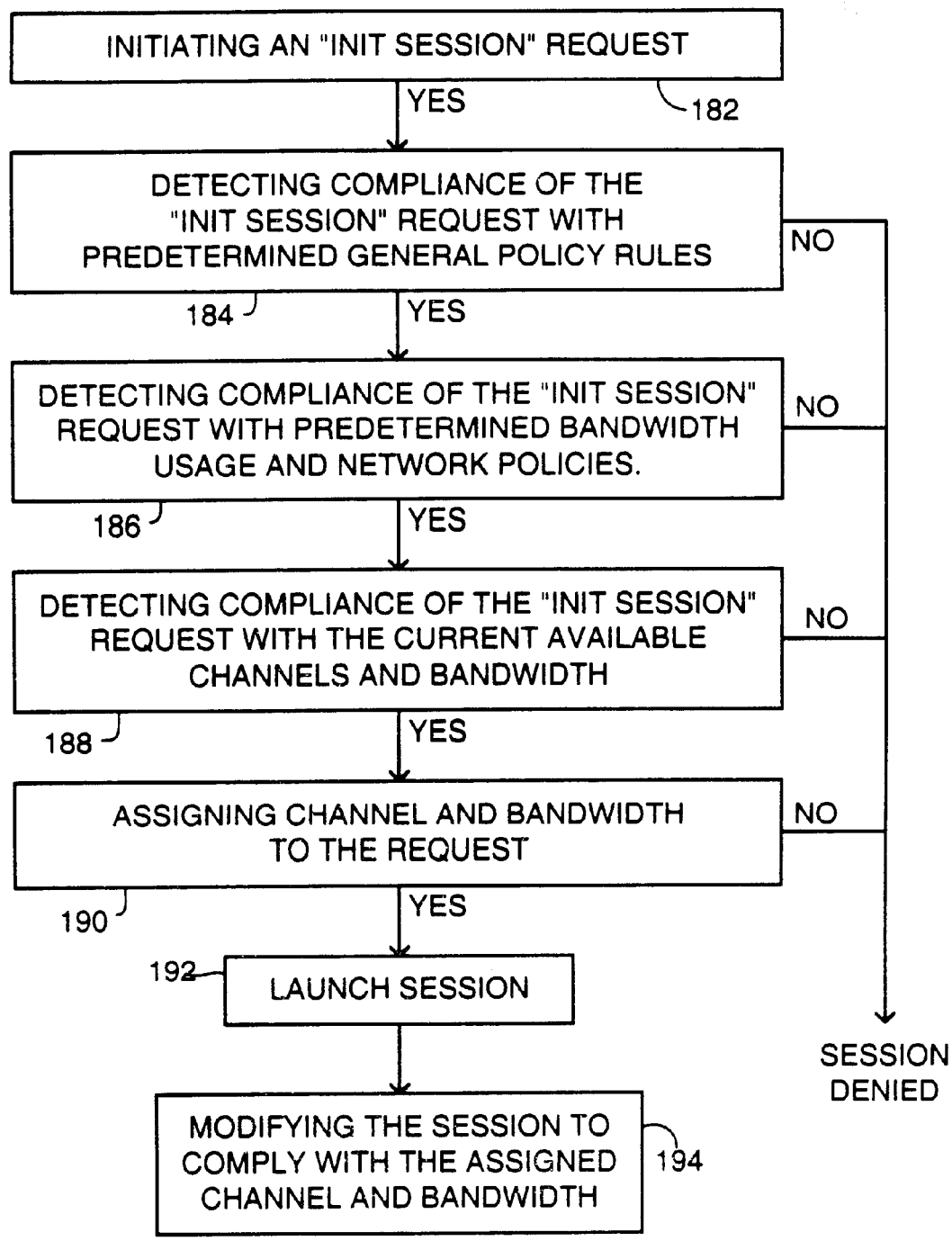
FIG. 3 is an illustration of a method for operating the session management architecture of FIG. 2A of the system of FIG. 1, operative in accordance with a further preferred embodiment of the present invention.

Reference is now made to FIG. 3, which is an illustration of a method for operating session management architecture 150 (FIG. 2A) of system 100 (FIG. 1), operative in accordance with another preferred embodiment of the present invention. In step 182, a session initialization request is initiated. With reference to FIG. 2A, session manager 102 receives an init-session request, as described herein above.

In step 184, compliance of the session initialization request with predetermined general policy rules, is detected. With reference to FIG. 2A, session manager 102 checks compliance of the requested session with policy records of database 156. If such compliance is not detected, then the session is denied.

In step 186, compliance of the session initialization request with predetermined bandwidth usage and network policies, is detected. With reference to FIG. 2A, session manager 102 determines if the requested session can be approved according to a plurality of parameters such as network policies in the network database 160, target policies in target database 158, general policies in the policy database 156, application manager policies in the external application database 162, additional information resources 164, and the like. If such compliance is not detected, then the session is denied.

In step 188, compliance of the session initialization request with the current available channels and bandwidth, is detected. With reference to FIG. 2A, shared area manager 154 checks compliance of the session with channels and bandwidth, which are currently available in the potential path of the session. If such compliance is not detected, then the session is denied. It is noted that step 188 can further include dynamic reallocating of network resources so as to make channels and bandwidth available to the requested session.

In step 190, channel and bandwidth are assigned to the requested session. With reference to FIG. 2A, shared area manager 154 assigns channel and bandwidth to the requested session, which is then launched (step 192). When the available bandwidth is narrower than the one required for the session, and the session can either:

(a) tolerate a reduction in quality or (b) tolerate a reduction in a number of transmitted delayed media unit sequences, if the session involves the transmission of a live media unit sequence and delayed media unit sequences, then such reduction can be imposed (step 194). Launching a session according to step 192 includes programming the selected input module, the switch 274 and the selected output module. It is noted that the bandwidth utilization collector 104 (FIG. 1) can also be updated accordingly.

In further detail, the DNR manager 106 performs channel and frequency switching (in hardware), and dynamically changes the amount of channels which are dedicated to each group of nodes, according to the bandwidth usage across groups of nodes. This allocation can be dynamic as long as the total number of dedicated channels does not exceed the maximum frequency band, that is physically achievable within any specific group of nodes.

Figure 4:
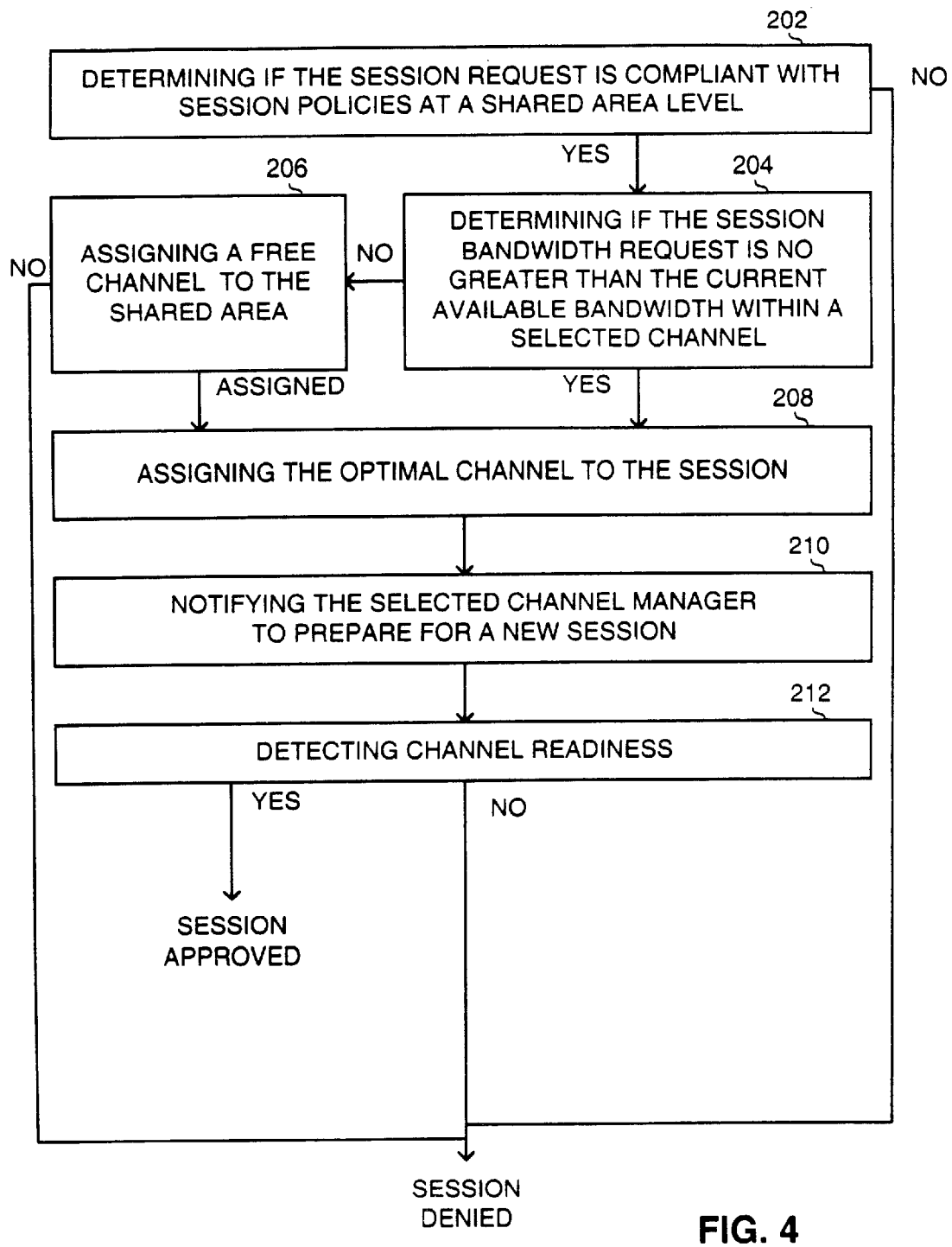
FIG. 4 is an illustration of a method for operating the area manager of FIG. 2A, operative in accordance with another preferred embodiment of the present invention.

Reference is now made to FIG. 4, which is an illustration of a method for operating shared area manager 154 of FIG. 2A, operative in accordance with a further preferred embodiment of the present invention. It is noted that shared area manager 154 is preferably a logical module, which is used to manage a physical shared area, to which a plurality of nodes are connected.

In step 202, compliance of the initialization session request against session policies at a shared area level, is determined. If such compliance is not determined, then the session is denied.

In step 204, the session bandwidth request, respective of the initialization session request, is compared with the current available bandwidth within a selected channel. It is noted that a conventional session can run over one or more channels, where each channel has to be able to provide a predetermined bandwidth. Accordingly, If the session bandwidth request is greater than the current available bandwidth with respect to selected channels, then session request proceed to step 206, else session request proceed to step 208.

In step 206, a free channel is assigned to the current shared area where one is available. This assignment is performed by the DNR 106 as will be described herein below. If such assignment fails, then the session request is denied.

In step 208, an optimal channel is assigned to the session, based on session content type & load balancing network policy. Optimization schemes for managing the load can be determined according to various considerations and can be set by the system operator.

In step 210, the selected channel manager is notified to prepare for a new session. The channel manager adds, by means of multiplexing, this new session to the sessions, which are currently present in that channel. It is noted that this notification can further include session parameters, which are directed at reducing the bandwidth of that session or other selected sessions in the channel.

In step 212, the channel readiness is determined. If the channel is not ready, then the session request is denied. Otherwise, the session request is approved.

Figure 5:
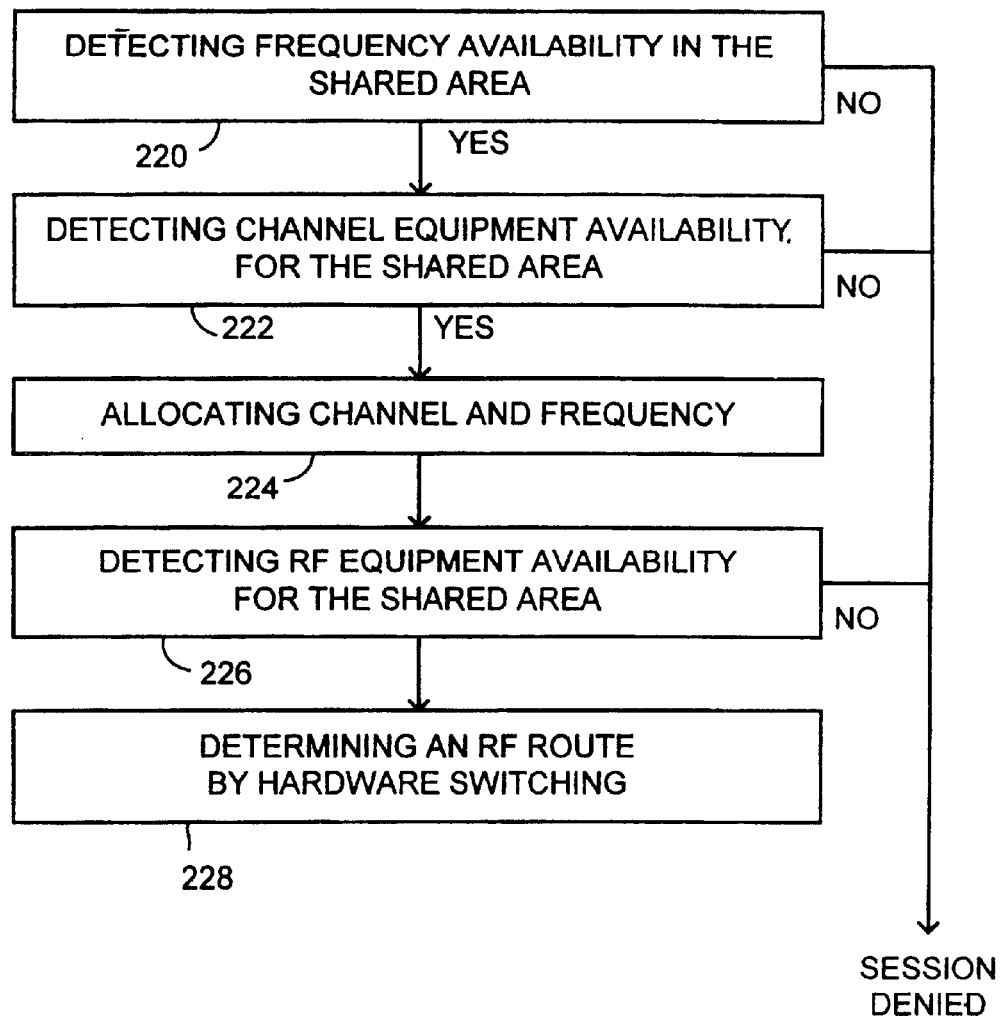
FIG. 5 is an illustration of a method for operating the dynamic network resources manager of FIGS. 1 and 2A, operative in accordance with a further preferred embodiment of the present invention.

Reference is now made to FIG. 5, which is an illustration of a method for operating the DNR manager 106 of FIGS. 1 and 2A, operative in accordance with another preferred embodiment of the present invention. In step 220, bandwidth availability in the shared area, is detected. The bandwidth availability is detected with respect to the frequency bandwidth which is regularly available, and with respect to the currently running application, applications which are scheduled to run during the anticipated time frame of the session request, and other considerations such as bandwidth, which has to be reserved, and the like. If frequency bandwidth is not available, according to the session request, then the session request is denied.

In step 222, availability of channel equipment at the shared area (hardware) is detected. Such channel equipment can include for example an available QAM unit. If such channel equipment is not available, then the session request is denied.

In step 224, channel and frequency are allocated. With reference to FIG. 1, dynamic network restructuring unit 106 operates a selected QAM unit, to modulate the soon to be running session, at a selected frequency bandwidth.

in step 226, RF equipment availability is located for the shared area. Such RF equipment is for example an available input port at a functioning RF combiner. If such RF equipment, which meets the requirements of the session request, is not available, then the session request is denied.

In step 228, an RF route is determined by hardware switching. With reference to FIG. 1, dynamic network restructuring unit 106 operates RF switch 120 to connect a selected QAM of QAM array 118, to a selected input port at a selected RF combiner of RF combiner array 122.

Figure 6A:
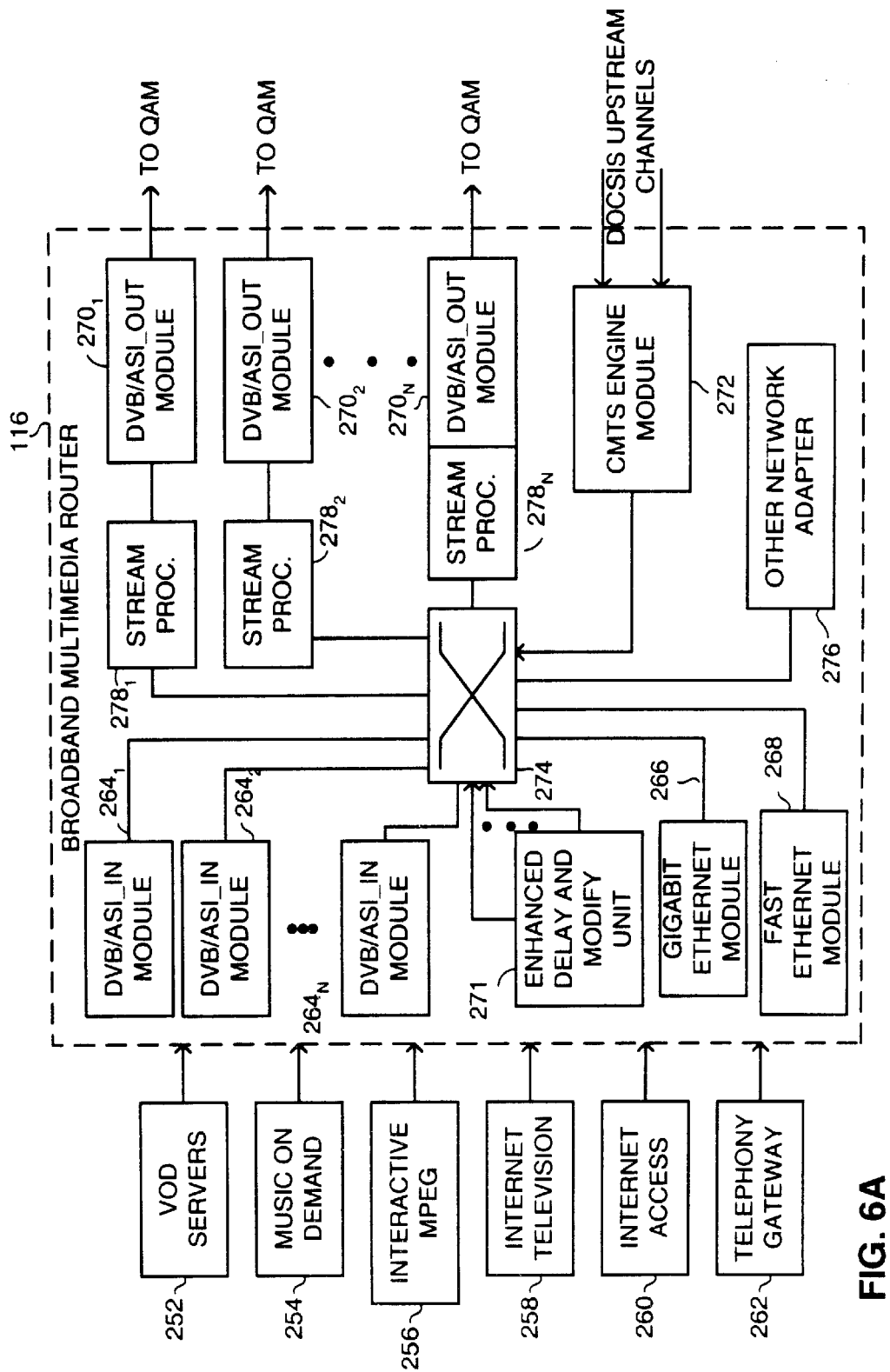
FIG. 6 is a schematic illustration in detail of the router of FIG. 1, constructed and operative in accordance with another preferred embodiment of the present invention.
Figure 6B:
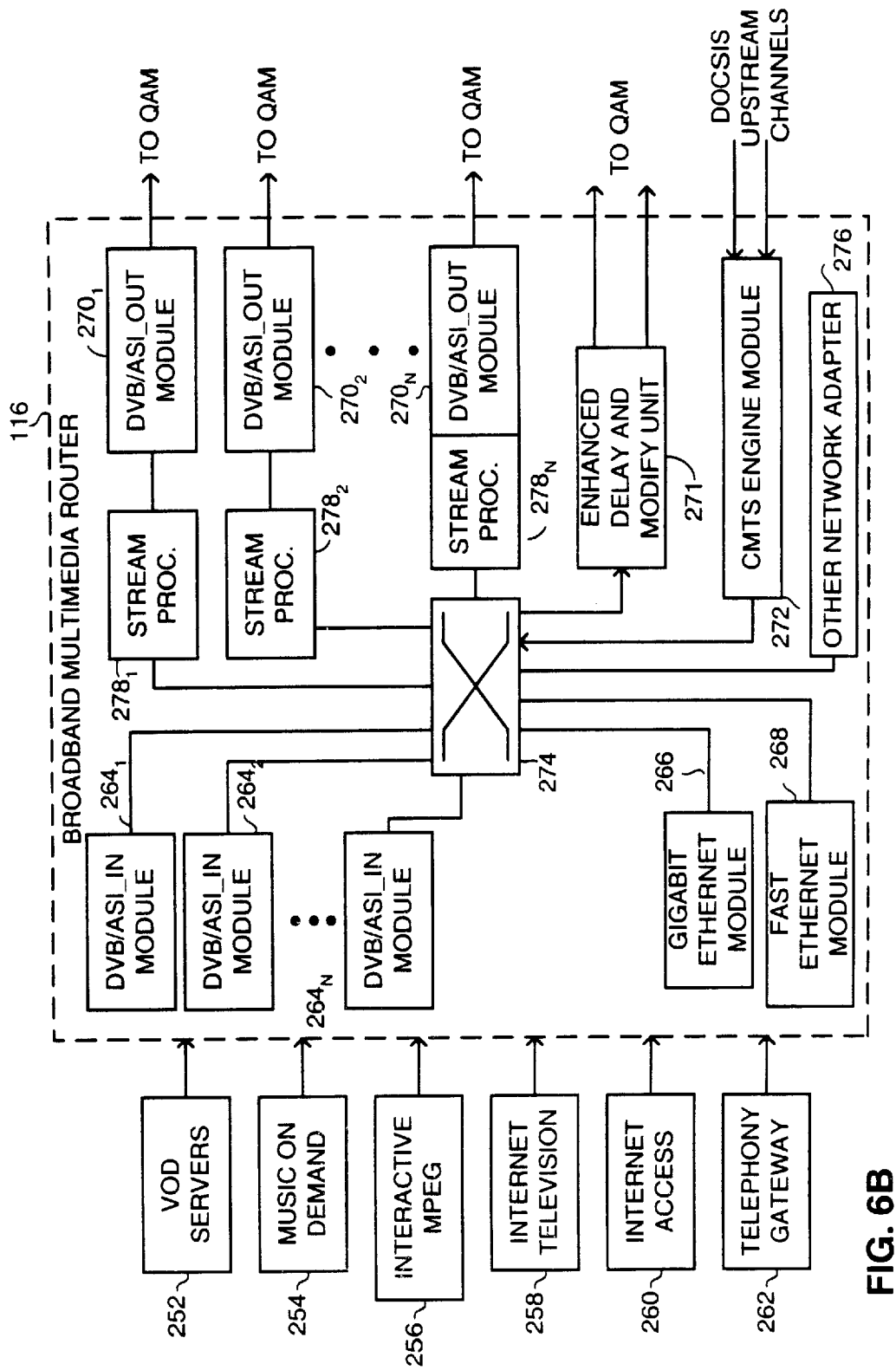

Reference is now made to FIGS. 6a and 6b, which are schematic illustration in detail of broadband multimedia router 116 of FIG. 1, constructed and operative in accordance with further preferred embodiments of the invention. Broadband multimedia router 116 is operative to direct a variety of packet types, even when a packet does not include destination address information. Broadband multimedia router 116 is further operative to generate a plurality of delayed media unit sequences, such as but not limited to delayed programs from a received live sequence of media units, such as but not limited to a live program. Broadband multimedia router 116 has at least one delay and modification unit, such as delay and modification unit 271, each configured to receiving a single live media unit sequence and generating a plurality of delayed media unit sequences.

As shown in FIGS. 6a and 6b, a delay and modification unit can be logically placed at various locations within the broadband multimedia router, such as before switch 274 or after switch 274. Delay and modification unit 271 can include at least one circular buffer, for delaying a received program for a period determined by a difference between read and write pointers. A modification unit can also include the functionality of stream processors and/or DVB/ASI_IN or DVB/ASI_OUT modules.

Delay and modification unit 217 has a single input for receiving a live program and a plurality of outputs for providing at least one delayed program and the live program as well.

According to another aspect of the invention each of the delay and modification units is coupled to a management unit such as session management unit 102, for receiving control signals for determining the number of delayed programs that are generated from a single live program and the delay period between consecutive delayed programs. The delay period can be adjusted by adjusting a difference between read and write pointers of a circular buffer that stores a live program or a delayed program.

According to the present invention, broadband multimedia router 116 makes sure that each entering data packet, which does not include destination information, is assigned such information, according to the session directing commands provided by the session manager 102.

Broadband multimedia router 116 is fed from a plurality of media sources such as VOD servers 252, music on demand unit 254, interactive MPEG unit 256, Internet television 258, Internet access 260, telephony gateway 262, and the like. Broadband multimedia router 116 includes a plurality of DVB/ASI__IN modules $264_1$, $264_2$ and $264_N$, Gigabit Ethernet module 266, Fast Ethernet module 268, a plurality of DVB/ASI__OUT modules $270_1$, $270_2$ and $270_N$, a plurality of stream processors $278_1$, $278_2$ and $278_N$, a CMTS Engine Module 272, an additional network adapter 276, and a core switch 274. It is noted that broadband multimedia router 116 further includes an internal controller and intermediate memory means (not shown), for operating and coordinating the various units thereof. Additional network adapter 276 is operative to connect to various network types such as ATM, SONET, and the like.

Switch 274 is connected to DVB/ASI__IN modules $264_1$, $264_2$ and $264_N$, Gigabit Ethernet module 266, Fast Ethernet module 268, additional network adapter 276 and CMTS Engine Module 272. Switch 274 is further connected to DVB/ASI__OUT modules $270_1$, $270_2$ and $270_N$, via respective stream processors $278_1$, $278_2$ and $278_N$.

DVB/ASI__IN modules $264_1$, $264_2$ and $264_N$ are input ports, which receive MPEG transport packets. It is noted that an MPEG transport packet encapsulating elementary media, includes a stream ID, also called PID. Stream processors $278_1$, $278_2$ and $278_N$ are operative to perform stream processing procedures such as multiplexing, re-multiplexing, rate adaptation, PID re-mapping, PCR re-stamping, updating system information embedded in transport streams, and the like. It is noted that stream processors 278 can be considered an integral part of broadband multimedia router 116.

The following is an example for a complex routing situation, which is performed by broadband multimedia router 116.

DVB/ASI__IN module $264_2$ receives four media streams $S_4$, $S_5$, $S_6$, and $S_7$, having PID numbers 100, 120, 200 and 300, respectively. Media streams $S_4$, $S_5$, $S_6$, and $S_7$ are to be directed to DVB/ASI__OUT modules $270_2$, $270_7$ (not shown), $270_1$ and $270_{23}$ (not shown), respectively.

Substantially, at the same time, enhanced delay and modification unit 271 having DVB/ASI__IN module functionalities receives a media stream $S_1$ having PID number 50. It delayed the media stream to provide delayed media streams $S_2$ and $S_3$. $S_1$, $S_2$ and $S_3$ are destined to DVB/ASI__OUT module $270_2$.

In the present example, core switch 274 is a generic packet switching device and hence every packet provided thereto, has to be in a known addressable packet format. With respect to the media streams received at DVB/ASI__IN module $264_2$, broadband multimedia router 116 encapsulates each packet of each media stream out of $S_4$, $S_5$, $S_6$ and $S_7$ in an addressable packet, with destination information respective of the switch port, connected to DVB/ASI__OUT modules $270_2$, $270_7$, $270_1$ and $270_{23}$, respectively and their original stream PID (100, 120 200 and 300 respectively). Switch 274 directs the produced addressable packets to DVB/ASI__OUT modules $270_2$, $270_7$, $270_1$, and $270_{23}$ respectively which open the encapsulation, reconstruct the media stream packet, and assigns the stream PID provided by broadband multimedia router 116. It is noted that broadband multimedia router 116 can provide a stream PID, which is different from the original stream PID of the packet, as will be described herein below.

With respect to the media streams received at enhanced delay and modification unit 271, broadband multimedia router 116 encapsulates a packet of each of media stream $S_2$, in an addressable packet, with destination information respective of the switch port connected to DVB/ASI__OUT module $270_2$ but assigns a PID, such as 150, that differs from the PID of other media streams (such as PID 100 of $S_4$ and PID 50 of $S_1$).

It is noted that each DVB/ASI__IN module and enhanced delay and modify module having DVB/ASI__IN capabilities is configured to perform PIR re-mapping (exchanging a PID of a received media stream) if more than a single media stream destined to the same DVB/ASI__OUT module have the same PID.

Broadband multimedia router 116 encapsulates a packet of media streams $S_5$ and $S_7$, in addressable packets, with destination information respective of the switch port connected to DVB/ASI__OUT modules $270_7$ and $270_{23}$, with their respective original PIDs 120 and 300.

The above routing procedure is performed according to specific instruction provided by the session manager 102, for example, by means of a routing table. In case of an MPEG transport packet, broadband multimedia router 116 accesses the routing table according to the stream PID of that packet, and the DVB/ASI__IN module identification, which was received, and retrieves the predetermined destination associated therewith. It is noted that the predetermined destination is respective of the combination of the packet stream PID, and the respective DVB/ASI__IN module identification.

A data packet received from Gigabit Ethernet module 266, or from Fast Ethernet module 268, is typically an addressable packet and hence already contains destination information. This data packet can be directed to a respective output port of the switch, according to that destination information. It is noted that session manager 102 can instruct broadband multimedia router 116, for example, by means of a routing table, to direct addressable packets to predetermined ports, which are set to be different but according to the destination information embedded in the packet.

Broadband multimedia router 116 is further operative to perform various stream processing procedures such as multiplexing, re-multiplexing, rate adaptation, PID re-mapping, PCR re-stamping (e.g., jitter reduction procedure by updating the program clock reference fields), updating system information embedded in transport streams, and the like. Such stream processing procedures are usually carried in an outgoing route of broadband multimedia router 116 (e.g., either in switch 274, in one of the output modules 270, 276, 266 and 268, or in the route there between, by specific modules). In the present example, each of the DVB/ASI__OUT modules 270 is also operative to encapsulate other types of data in MPEG transport format, perform statistical multiplexing, and stream rate adaptation, to adapt the bandwidth and quality of the media stream to the available network resources.

CMTS Engine Module 272 receives data over MPEG transport from the end user in the up stream direction, transforms it to IP format and provides it to the switch 274, for directing to an IP module such as Gigabit Ethernet module 266, or Fast Ethernet module 268. CMTS Engine Module 272 further transmits DOCSIS downstream information to the end user via DVB/ASI_OUT modules 270.

Figure 7:
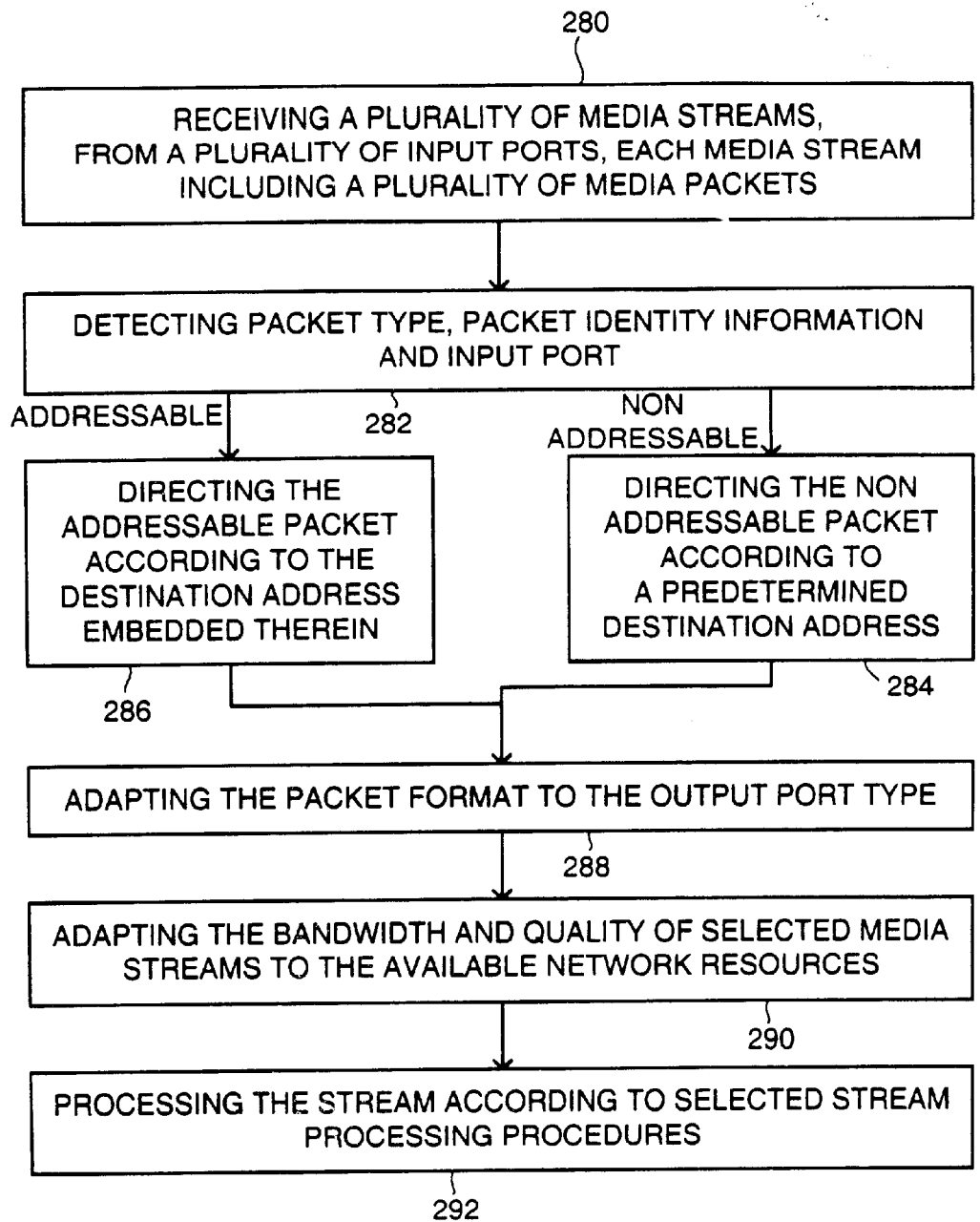
FIG. 7 is an illustration of a method for operating the router of FIG. 6, operative in accordance with a further preferred embodiment of the present invention.

Reference is now made to FIG. 7, which is an illustration of a method for operating broadband multimedia router 116 of FIG. 6, operative in accordance with another preferred embodiment of the present invention. In step 280 a plurality of media streams are received from a plurality of input ports, where each media stream includes a plurality of media packets. These media streams can include video streams, audio streams, data streams and the like. With reference to FIG. 6, DVB/ASI_IN modules $264_1$, $264_2$ and $264_N$, Gigabit Ethernet Module 266, and Fast Ethernet module 268 receive a plurality of media streams from VOD Servers 252, music on demand 254, interactive MPEG 256, Internet television 258, Internet access 260, telephony gateway 262, and the like.

In step 282 the type of a selected packet, its identity and the input port in which it was received, are detected. These media streams are generally divided in two types, which are addressable media streams and non-addressable media streams. An addressable media stream includes specific destination information, which is typically embedded in each of its packets, such as in IP packet, Ethernet packet, and the like. Such destination information is used to direct each packet to the final destination, and do so at different routes for each packet. A non-addressable media stream does not include specific destination information, such as MPEG transport elementary stream, which only includes a packet identification code, indicating that the stream packets belong to the same stream. With reference to FIG. 6, broadband multimedia router 116 determines the packet type, according to the type of input port it was received in. A packet received in a DVB/ASI_IN module 264 is a non-addressable multimedia stream oriented packet (e.g. video, audio or data over multi-media transport standards such as IP over MPEG transport).

A packet received in Gigabit Ethernet module 266 or from Fast Ethernet module 268 is an addressable media stream oriented packet, such as an IP packet. The identity and input port information is stored and used in the routing process of each packet. If the packet is non-addressable media stream oriented, then the method proceeds to step 284. Otherwise, if the packet is addressable media stream oriented, then the method proceeds to step 286.

In step 284, a non -addressable packet is directed according to a predetermined destination address. Hence, a non-addressable media stream packet is temporarily converted into an addressable media stream packet, which hence, can be directed. The destination address is provided by the session manager 102 (FIG. 1), and is retrieved momentarily according to the packet stream identification, and according to the identification of the input port, which received it. It is noted that a packet can have more than one destination address. This is known as multicast.

In step 286, an addressable packet is directed according to a destination address embedded therein. It is noted that this address can further be translated to another predetermined destination address provided by the session manager 102 (FIG. 1).

In step 288, the packet format is adapted to conform to the type of the output port. If the routing was performed on data oriented packets, such as IP packets, and the output port type is DVB/ASI, then the packet is converted as follows: a stream oriented packet which was encapsulated in an IP packet format, is reconstructed. A data oriented packet is converted to (encapsulated in) MPEG transport format packets.

In steps 290 and 292, the bandwidth and quality of selected media streams are adapted to meet the available network resources and the stream is processed according to selected stream processing procedures, such as multiplexing, re-multiplexing, rate adaptation, PID re-mapping, PCR re-stamping, updating system information embedded in transport streams, and the like. With reference to FIG. 6, these operations are performed by DVB/ASI_OUT modules 270 and stream processors 278.

This technique of enabling non addressable media stream switching (such as MPEG) provides several advantages such the enhanced sharing of bandwidth among several sessions, the mere mixing of addressable media streams with non addressable media streams, enhanced hardware and bandwidth utilization and more. It is noted that some of the media streams are live programs and some are delayed programs.

Figure 8:
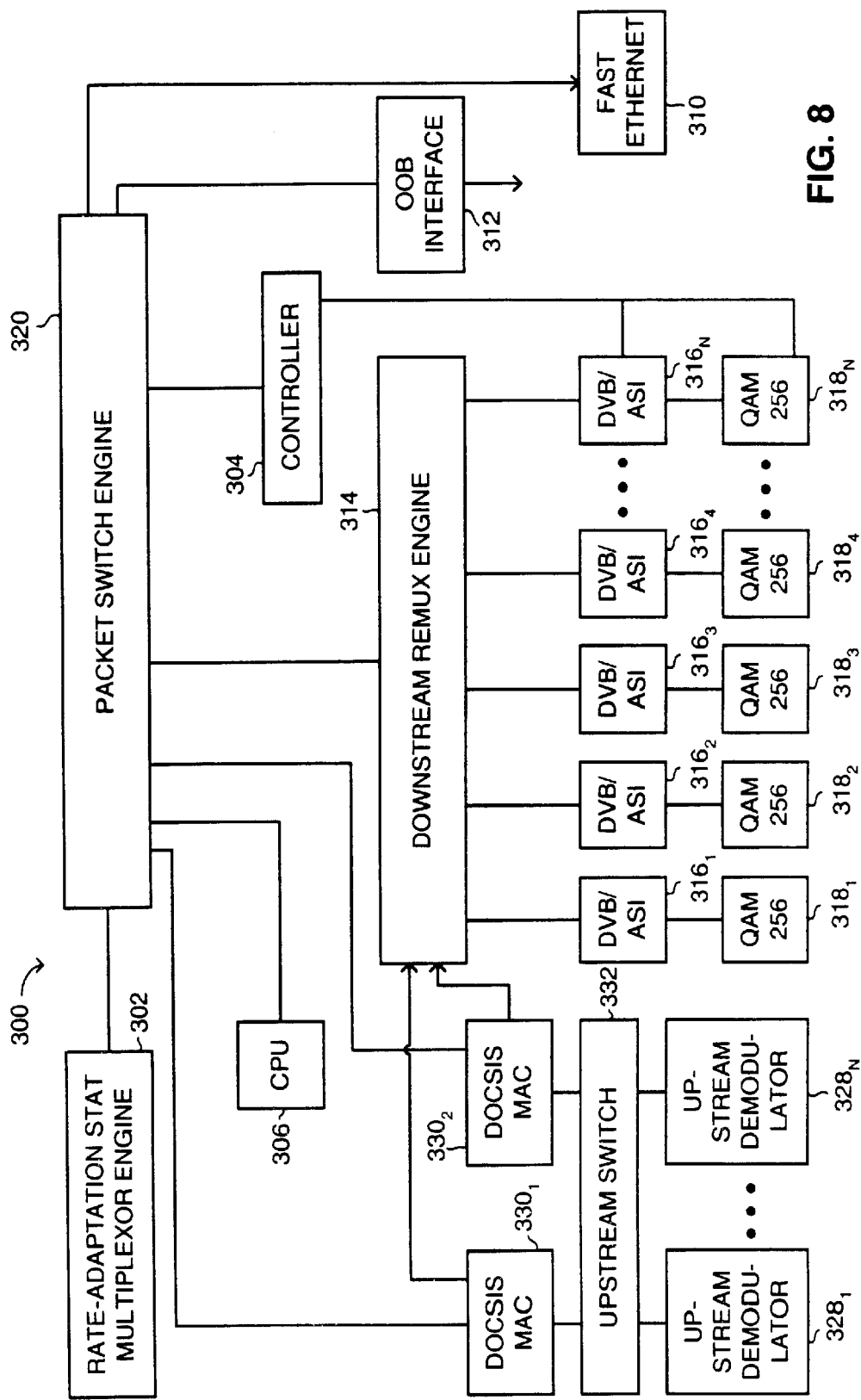
FIG. 8 is a schematic illustration of a packet switch system, constructed and operative in accordance with another preferred embodiment of the present invention.

Reference is now made to FIG. 8, which is a schematic illustration of a packet switch system, generally referenced 300, constructed and operative in accordance with a further preferred embodiment of the invention. System 300 includes a packet switch engine 320, a rate-adaptation statistical-multiplexer engine 302, a controller 304, a CPU 306, Fast Ethernet interface 310 and an outof-band interface 312 to the out-of-band manager (not shown), a downstream remultiplexer engine 314, and a plurality of DVB/ASI modules $316_1$, $316_2$, $316_3$, $316_4$ and $316_N$. System 300 further includes a plurality of QAM units $318_1$, $318_2$, $318_3$, $318_4$ and $318_N$, two DOCSIS MAC units $330_1$ and $330_2$, an upstream switch 332, and a plurality of upstream demodulators $328_1$ and $328_N$.

Packet switch engine 320 is connected to rate-adaptation statistical-multiplexer engine 302, controller 304, downstream re-multiplexer engine 314, Fast Ethernet interface 310, out-of-band interface 312, CPU 306 and DOCSIS MAC units $330_1$ and $330_2$. Downstream re-multiplexer engine 314 is further connected to DVB/ASI modules $316_1$, $316_2$, $316_3$, $316_4$ and $316_N$. Each DVB/ASI module 316 is further connected to a respective QAM unit $318_1$, $318_2$, $318_3$, $318_4$ and $318_N$. Upstream switch 332 is connected between upstream demodulators $328_1$ and $328_N$, and DOCSIS MAC units $330_1$ and $330_2$. Each output channel directed through a selected DVB/ASI module, is operative to transmit a plurality of video sessions, as well as a plurality of DOCSIS sessions, at the same time.

Each of the upstream demodulators $328_1$ and $328_N$ performs down-conversion, and demodulation to upstream channels received from an end user. The upstream switch 332 receives a plurality of upstream channels from upstream demodulators $328_1$, and $328_N$, each carrying DOCSIS return path information. The upstream switch 332 is operative to direct each of the received upstream channels, to each of the DOCSIS MAC units $330_1$ and $330_2$, thereby providing improved bandwidth efficiency, and better redundancy and reliability for the upstream functionality. This architecture allows the upstream resources to be dynamically allocated to each of DOCSIS MAC units $330_1$ and $330_2$. When noise or other errors appear on a specific upstream channel, switch 332 can dynamically change the upstream channel allocation.

DOCSIS MAC units $330_1$ and $330_2$ provide packets received from upstream switch 332, either to downstream re-multiplexing engine 314 or to packet switch engine 320, depending on the packet content type and original destination. Downstream re-multiplexer engine 314 performs data encapsulation, statistical multiplexing and video rate adaptation and multiplexing.

System 300 can further perform load balancing of outgoing transmission of various types, at the same time and through the same outgoing channels, such as a plurality of video streams and a plurality of DOCSIS sessions, transmitted over the same DVB/ASI modules 316. CPU 306 determines and controls the load balancing between such competing elements and provides parameters there according, to downstream re-multiplexing engine 314, rate adaptation statistical multiplexer engine 302 and DOCSIS MAC units $330_1$, and $330_2$.

For example, a video stream and a DOCSIS session, which are transmitted over one of the DVB/ASI modules 316 initially separated to various quality levels (described herein below in conjunction with FIGS. 10A–10K), where the first quality level denotes a minimal quality which has to be provided at all times. Higher quality levels can be provided when sufficient bandwidth is available therefor. It is therefor noted that the first quality level has the highest transmit priority.

DOCSIS sessions can be categorized according to quality of service associated therewith or assigned thereto. For example, an Email session would normally be characterized by a low level of quality of service and telephony sessions would normally be characterized by a high level of quality of service. CPU 306 constantly detects the load status of the system 300 and dynamically assigns transmit priority to the DOCSIS sessions processed by DOCSIS MAC units $330_1$ and $330_2$. Hence, when system 300 is significantly loaded by video sessions, some non real time sessions such as DOCSIS Email sessions can be delayed or assigned narrower bandwidth, while real time sessions, such as telephony sessions are forced into the transmit route, even at the expense of further degrading the quality of currently transmitting video sessions towards their first quality level.

Packet switch engine 320 receives different types of information via different input modules, such as Fast Ethernet interface 310 (coupled to the Internet or to similar networks), or out-of-band interface 312. Packet switch engine 320 analyzes the nature of the received streams simultaneously, and directs them according to a decision scheme illustrated herein below in conjunction with FIG. 9. Controller 304 controls the operation of the packet switch engine 320.

The rate-adaptation statistical-multiplexer engine 302, performs statistical multiplexing as well as rate adaptation when required, to elementary streams, before they are directed by the switch 320. CPU 306 is the central processing unit of the system, and can be supported in a cluster by other CPUs for increased system redundancy.

Figure 9:
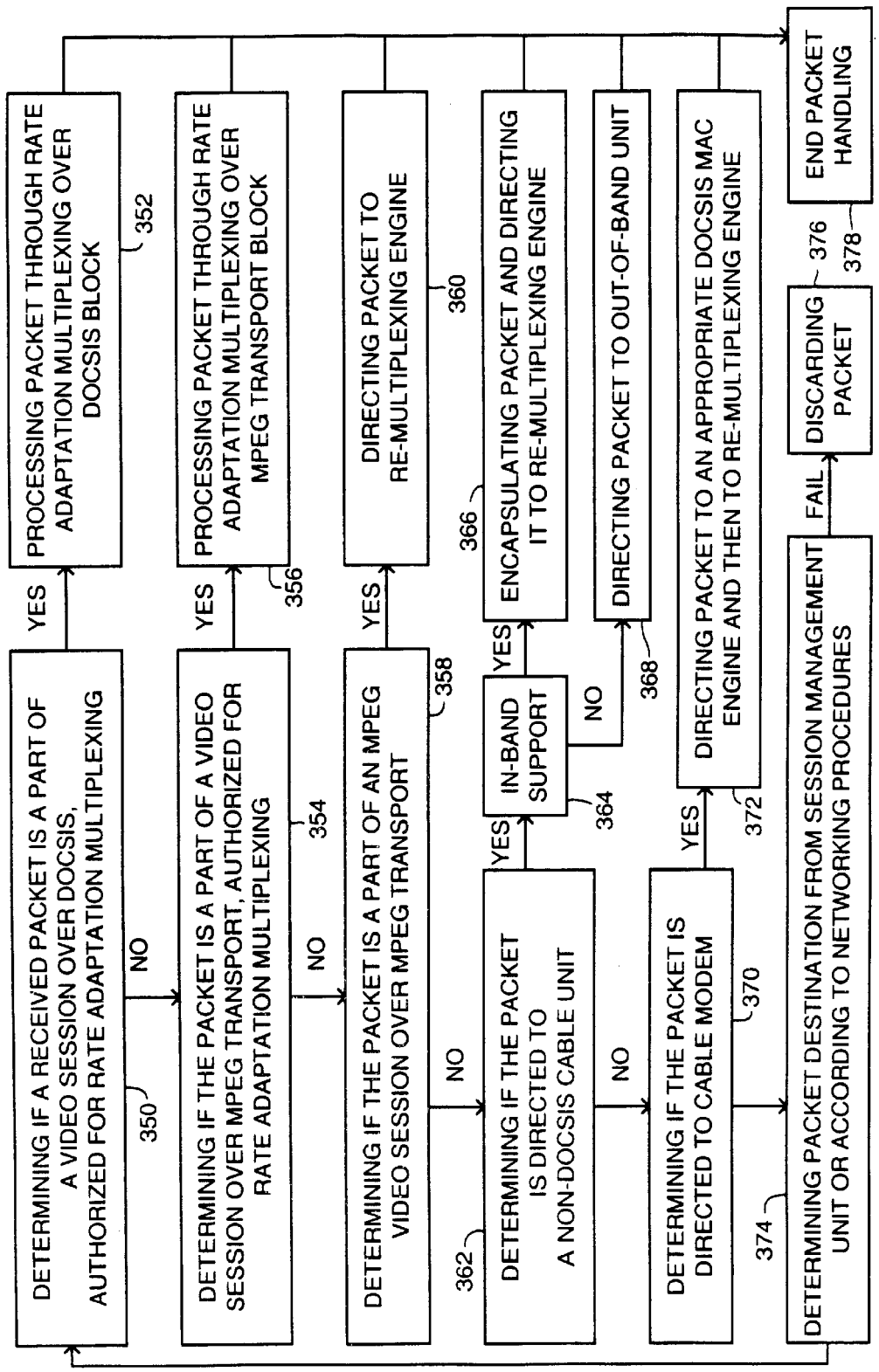
FIG. 9 is a schematic illustration of a method for operating the system of FIG. 8, operative in accordance with a further preferred embodiment of the present invention.

Reference is now made to FIG. 9, which is a schematic illustration of a method for operating system 300 of FIG. 8, operative in accordance with another preferred embodiment of the present invention.

In step 350, a received packet is analyzed to determine if it is a part of a video session over IP over DOCSIS, authorized for rate adaptation multiplexing. If so, then the packet is rate adapted (when required) and multiplexed over a DOCSIS block (step 352). With reference to FIG. 8, the packet is directed to module 302, where such operations are performed, and then further directed to DOCSIS MAC units 330 for further direction to the downstream re-multiplexing engine 314. Otherwise, the method proceeds from step 354.

In step 354, the received packet is further analyzed to determine if it is a part of a video session over MPEG transport, authorized for rate adaptation multiplexing. If so, then the packet is rate adapted (when required) and multiplexed over an MPEG transport block (step 356). With reference to FIG. 8, the packet is directed to module 302, where such operations are performed and further directed to downstream re-multiplexing engine 314. Otherwise, the method proceeds from step 358.

In step 358, the received packet is further analyzed to determine if it is a part of an MPEG video session over MPEG transport. If so, then the packet is directed to the cable system (step 360). With reference to FIG. 8, the packet is directed to downstream re-multiplexing engine 314. Otherwise, the method proceeds from step 362.

In step 362, the received packet is further analyzed to determine if its destination is a non-DOCSIS cable unit (for example an IP packet). If so, and the destination non-DOCSIS cable unit includes In-Band support for IP data (step 364), then the packet is encapsulated and re-multiplexed (step 366), before it is sent to that destination non-DOCSIS cable unit. But if the destination non-DOCSIS cable unit does not include In-Band support (step 364), then the packet is directed to the Out-Of-Band unit (step 368).

With reference to FIG. 8, since the packet is not a video packet, it is either encapsulated in MPEG transport and sent to the cable network via re-multiplexing engine 314, (step 366) when the receiving non-DOCSIS cable unit includes In-Band support, or sent through the Out-Of-Band via out-of-band interface 312 (step 368).

In step 370, the received packet is further analyzed to determine if its destination is a cable modem. If so then the packet is directed to the cable network via DOCSIS MAC with re-multiplexing. With reference to FIG. 8, the packet is directed to appropriate DOCSIS MAC engine 330, and then directed to the cable network via re-multiplexing engine 314.

In step 374, a final attempt is performed to classify the packet and determine its destination. If this attempt fails then the packet is discarded (step 376). With reference to FIG. 8, after the packet could not be classified, as described above, the session manager 102 is accessed to attempt to determine the packet destination. Further query procedures via conventional networking can also be performed at this time, for the same purpose. If the attempt to determine the destination of the packet fails, then the packet is discarded (step 376). Otherwise, the packet is directed to its destination and the method repeats from step 350 for the next packet.

It is noted that at the end of steps 352, 356, 360, 366, 368 and 370, the packet is substantially transmitted out of the routing system, and hence need not be handled anymore, thereby (step 378).

Figure 13:
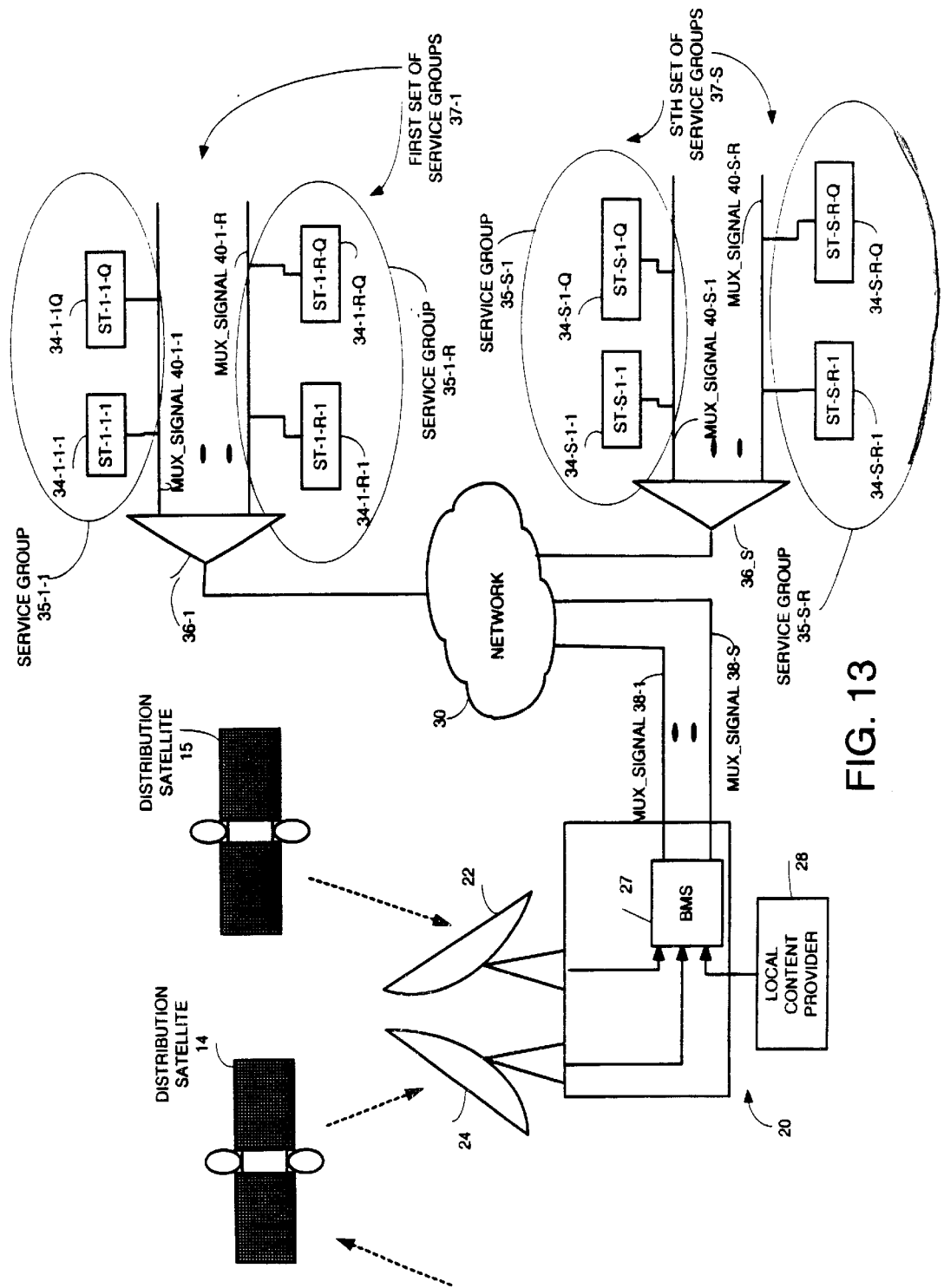
FIGS. 13 is an illustration of a broadband media system coupled to a plurality of end-users, in accordance with a further preferred embodiment of the present invention.

Referring to FIG. 13, illustrating distribution and management systems, such as the BMS 27, coupled to a plurality of sets of service groups, constructed and operative in accordance with preferred embodiments of the present invention.

BMS 27 can be functionally located within the local distribution centers and/or within hubs. In FIG. 13 BMS 27 is functionally located within a local distribution center 20. BMS 27 is coupled, via network 30 to a plurality of hubs, each hub includes a distribution unit, such as 36-1–36_S, for distributing content between end users that are coupled to the hub. The end-users are arranged in groups that are referred to as service groups. Distribution unit 36_s is coupled to a s'th set of service groups 37-s, via broadband networks, such as HFC, DSL networks and the like. The s'th set of service group includes a plurality of service groups 35-s-r, each service group includes end-users 34-s-r-1–34- sr-q. Whereas index s ranges between 1 and S, index r ranges between 1 and R. R,S, and q are positive integers. Different service groups of the same set can receive distinct context.

Live media unit sequence is converted to a live media unit sequence and a plurality of delayed sequences by BMS 27 and transmitted to at least some of the distribution units out of 36-1–36-S. The end users of the service group can provide end-user selection information via upstream channels. BMS 27 can further provide to service groups additional information such as additional media unit sequences.

It is noted that the conversion of a live media unit sequence to at least one delayed media unit sequence can be dome at the hubs.

It is noted that the method and apparatus according to the present invention can be implemented either in hardware, in software or in a combination thereof.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

We claim:

1. A method for allowing an end-user to control a display of a media unit sequence by filtering a media unit sequence from a multiplexed sequence comprising a live media unit sequence and a plurality of delayed media unit sequences, the method comprising the steps of:
    receiving a live media unit sequence;
    delaying the live media unit sequence by a plurality of delay periods thereby providing a delayed media unit sequence for each of said plurality of delay periods;
    modifying each delayed media unit sequence such that each delayed media unit sequence is distinguishable from another delayed media unit sequence and from the live media unit sequence;
    multiplexing the live media unit sequence and the plurality of delayed media unit sequences to generate a multiplexed sequence; and
    transmitting the multiplexed sequence to at least one end user.

2. The method according to claim 1 wherein each live media unit sequence has a media unit sequence identifier, wherein the step of modifying comprising changing the media unit sequence identifier of each delayed media unit sequence to provide distinct media unit sequence identifiers.

3. The method according to claim 2 wherein an end user filters a media unit sequence by selecting a media unit sequence identifier out of the distinct media unit sequence identifiers.

4. The method according to claim 3 wherein a predefined range of media unit sequence identifier values is allocated to the media unit sequence identifiers of delayed media unit sequences.

5. The method according to claim 1 wherein at least some of the plurality of delayed periods are adjustable.

6. The method according to claim 1 wherein the number of delayed media unit sequences is adjustable.

7. The method according to claim 1 wherein the multiplexed sequence is transmitted over a communication channel.

8. The method according to claim 7 further comprising a step of monitoring the multiplexed sequence and an available bandwidth of the communication channel to provide transmission parameters.

9. The method according to claim 8 further comprising a step of adjusting a number of delayed media unit sequences in response to the transmission parameters.

10. The method according to claim 8 further comprising a step of compressing at least one media unit sequence if the aggregate size of the multiplexed sequence exceeds the available bandwidth.

11. The method according to claim 7 wherein the step of multiplexing further comprising a step of multiplexing additional media unit sequences to provide the multiplexed sequence.

12. The method according to claim 11 further comprising a step of monitoring the multiplexed sequence and an available bandwidth of the communication channel to provide transmission parameters.

13. The method according to claim 12 further comprising a step of adjusting a number of delayed media unit sequences in response to the transmission parameters.

14. The method according to claim 12 further comprising a step of compressing a media unit sequence selected from the group consisting of an additional media unit sequence and a media unit sequence, if the aggregate size of the multiplexed sequence exceeds the available bandwidth.

15. The method according to claim 1 further comprising a step of analyzing end user's viewing patters and adjusting a number of delayed media unit sequences in response to the analysis of end users' behavior patterns.

16. The method according to claim 1 further comprising the steps of:
    receiving end-user selection information, being indicative of which media unit sequence out of a plurality of received media unit sequences to process to generate at least one delayed media unit sequence; and
    selecting which media unit sequence to process to provide delayed media unit sequences, in response to the end-users' selection information.

17. The method according to claim 1 further comprising receiving end-users' selection information, being indicative of a number of delayed media unit sequences to produce out of a single live media unit sequence, and delaying the live media unit sequence by a plurality of delay periods in response to the received end-users' selection information.

18. The method according to claim 1 further comprising receiving end-user selection information, being indicative of delayed periods, and delaying the live media unit sequence by a plurality of delay periods in response to the received end-user selection information.

19. The method according to claim 1 wherein each media unit sequence is a program.

20. The method according to claim 1 wherein each media unit sequence is MPEG compliant.

21. A system for allowing an end-user to control a display of a program by filtering a program from a multiplexed sequence comprising a live program and a plurality of delayed programs, the system comprising:
    at least one delay and modification unit, configured to receive a live media unit sequence and to delay the live media unit sequence by a plurality of delay periods thereby providing a delayed media unit sequence for each of said plurality of delay periods; and configured to modify each delayed media unit sequence such that each delayed media unit sequence is distinguishable from another delayed media unit sequence and from the live media unit sequence; and a multiplexer, coupled to the at least one delay and modification unit, configured to multiplex the live media unit sequence and at least one delayed media unit sequence to provide a multiplexed sequence.

22. The system according to claim 21 wherein each live media unit sequence has a media unit sequence identifier, wherein the system is further configured to change the media unit sequence identifier of each delayed media unit sequence to provide distinct media unit sequence identifiers.

23. The system according to claim 22 wherein an end user filters a media unit sequence by selecting a media unit sequence identifier out of the distinct media unit sequence identifiers.

24. The system according to claim 23 wherein a predefined range of media unit sequence identifier values is allocated to the media unit sequence identifiers of delayed media unit sequences.

25. The system according to claim 21 wherein at least some of the plurality of delayed periods are adjustable.

26. The system according to claim 21 wherein the number of delayed media unit sequences is adjustable.

27. The system according to claim 21 wherein the multiplexed sequence is transmitted over a communication channel.

28. The system according to claim 27 further comprising a monitor unit configured to monitor the multiplexed sequence and an available bandwidth of the communication channel to provide transmission parameters.

29. The system according to claim 28 further configured to adjust a number of delayed media unit sequences in response to the transmission parameters.

30. The system according to claim 28 further configured to compress at least one media unit sequence if the aggregate size of the multiplexed sequence exceeds the available bandwidth.

31. The system according to claim 27 wherein the multiplexer is further configured to multiplex additional media unit sequences to provide the multiplexed sequence.

32. The system according to claim 31 further configured to monitor the multiplexed sequence and an available bandwidth of the communication channel to provide transmission parameters.

33. The system according to claim 32 further configured to adjust a number of delayed media unit sequences in response to the transmission parameters.

34. The system according to claim 32 further adapted to compress a media unit sequence selected from the group consisting of an additional media unit sequence and a media unit sequence, if the aggregate size of the multiplexed sequence exceeds the available bandwidth.

35. The system according to claim 31 further configured to analyze end users viewing patters and adjust a number of delayed media unit sequences in response to the analysis of end users' behavior patterns.

36. The system according to claim 31 further configured to receive end-user selection information, being indicative of which media unit sequence out of a plurality of received media unit sequences to process to generate at least one delayed media unit sequence; and select which media unit sequence to process to provide delayed media unit sequences, in response to the end-user selection information.

37. The system according to claim 31 further configured to receive end-user selection information, being indicative of a number of delayed media unit sequences to produce out of a single live media unit sequence, and delay the live media unit sequence by a plurality of delay periods in response to the received end-user selection information.

38. The system according to claim 21 further configured to receive end-user selection information, being indicative of delayed periods, and delaying the live media unit sequence by a plurality of delay periods in response to the received end-user selection information.

39. The system according to claim 21 wherein each media unit sequence is a program.

40. The system according to claim 21 wherein each media unit sequence is MPEG compliant.

41. The system of claim 21 further comprising:

a plurality of input ports, including at least one non-addressable stream input port;

a plurality of non-addressable stream output ports;

a multiple port switch, connected between said non-addressable stream input ports and said non-addressable stream output ports;

wherein the delay and modification unit is coupled between a non-addressable input port to the multiple port switch, for receiving a non-addressable packet conveying a portion of a live media unit sequence, for delaying the received packet by a plurality of delay periods thereby providing a delayed packet for each of said plurality of delay periods and for modifying each delayed packet such that each delayed packet is distinguishable from another delayed packet and from the received packet;

said multiple port switch directing a packet, received a selected one of said at least one non-addressable stream input ports, to at least a selected one of said at least one non-addressable stream output ports;

said multiple port switch directing a delayed packet, received the delay and modification unit, to at least a selected one of said at least one non-addressable stream output ports;

said multiple port switch selecting said selected non-addressable stream output port according to the type and identity of said selected non-addressable stream input port and the identity information embedded in said received packet.

42. A method for allowing an end-user to control a display of a media unit sequence by filtering a media unit sequence from a multiplexed sequence comprising a live media unit sequence and a plurality of delayed media unit sequences, the method comprising the steps of:

receiving a packet conveying a portion of a live media source from an input port selected from at least one non-addressable stream input port;

delaying the packet by a plurality of delay periods thereby providing a delayed packet for each of said plurality of delay periods; modifying each delayed packet such that each delayed packet is distinguishable from another delayed media unit sequence and from the received packet;

selecting, for each of the received and the delayed packets, at least one of a plurality of non-addressable stream output ports according to the type and identity of said selected input port and the identity information embedded in said received packet and the delayed packet respectively; and directing each of the received packet and the delayed packet to a corresponding selected non-addressable stream output port.

43. A method for allowing an end-user to control a display of a media unit sequence by filtering a media unit sequence from a multiplexed sequence comprising a live media unit sequence and a plurality of delayed media unit sequences, the method comprising the steps of:

receiving a packet conveying a portion of a live media source from an input port selected from at least one non-addressable stream input port;

delaying the packet by a plurality of delay periods thereby providing a delayed packet for each of said plurality of delay periods;

modifying each delayed packet such that each delayed packet is distinguishable from another delayed media unit sequence and from the received packet; when the received packet is received from said at least one non-addressable stream input port, detecting identity information associated with said received packet, determining at least one destination port according to said identity information and embedding said packet and in each delayed packets in an addressable stream packet with a header directed to at least a selected one of said at least one destination port; and directing said data packet and the delayed packets to said destination port.

44. Broadband multimedia system comprising:

a communication bus;

at least one delay and modification unit, configured receive a live media unit sequence and to delay the live media unit sequence by a plurality of delay periods thereby providing a delayed media unit sequence for each of said plurality of delay periods, and configured to modify each delayed media unit sequence such that each delayed media unit sequence is distinguishable from another delayed media unit sequence and from the live media unit sequence; and a router, connected to said communication bus and further between a plurality of media sources, a plurality of network transmitters and a delay and modification unit;

a session manager, connected to communication bus, said session manager providing routing instructions to said router, for directing live media unit sequences received from said media sources and delayed media unit sequences to said network transmitters for transmitting over a broadband network.

* * * * *